United States Patent
Hogan et al.

(10) Patent No.: US 10,776,574 B1
(45) Date of Patent: Sep. 15, 2020

(54) CUSTOM SUMMARIZATION IN CATEGORIES

(71) Applicant: Apple Inc., Cupertino, CA (US)

(72) Inventors: Edward Patrick Hogan, Pittsburgh, PA (US); Anukul Kapoor, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/358,591

(22) Filed: Mar. 19, 2019

(51) Int. Cl.
*G06F 40/00* (2020.01)
*G06F 40/18* (2020.01)
*G06F 3/0482* (2013.01)
*G06F 3/0484* (2013.01)

(52) U.S. Cl.
CPC ............ *G06F 40/18* (2020.01); *G06F 3/0482* (2013.01); *G06F 3/04847* (2013.01)

(58) Field of Classification Search
CPC .................................................... G06F 17/246
See application file for complete search history.

(56) References Cited

U.S. PATENT DOCUMENTS

| | | | | |
|---|---|---|---|---|
| 8,549,392 B2 * | 10/2013 | Simkhay | ............... | G06F 17/246 715/212 |
| 8,682,886 B2 | 3/2014 | Sorkin et al. | | |
| 9,224,217 B2 * | 12/2015 | Winkle | .................... | G06T 11/20 |
| 9,378,198 B2 | 6/2016 | Vigesaa et al. | | |
| 2001/0007988 A1 * | 7/2001 | Bauchot | ............... | G06F 17/246 |
| 2006/0218483 A1 * | 9/2006 | Weitzman | ............. | G06F 17/246 715/212 |
| 2007/0112724 A1 * | 5/2007 | Beach | ...................... | G06F 16/20 |
| 2007/0168891 A1 * | 7/2007 | Damery | .................. | G10L 13/00 715/865 |
| 2013/0124960 A1 * | 5/2013 | Velingkar | ............... | G06F 16/20 715/220 |

OTHER PUBLICATIONS

Brath et al., "Excel Visualizer: One Click WYSIWYG Spreadsheet Visualization," Proceedings of the Information Visualization 2006, copyright 2006 UEEE, p. 1-6. (Year: 2006).*

* cited by examiner

*Primary Examiner* — Amelia L Tapp
(74) *Attorney, Agent, or Firm* — Fletcher Yoder PC

(57) ABSTRACT

Systems, methods, and devices for modifying a summary cell for a set of organized cells are provided. In some embodiments, the summary cells may be modified by modification of the summary function, such that modification may include a function and/or text that is different than preexisting summary function options for a summary cell. In some embodiments, the modification of the summary cell for the set of organized cells may update summary cells for additional sets of organized cells using a corresponding function and/or text that is different than preexisting summary function.

20 Claims, 28 Drawing Sheets

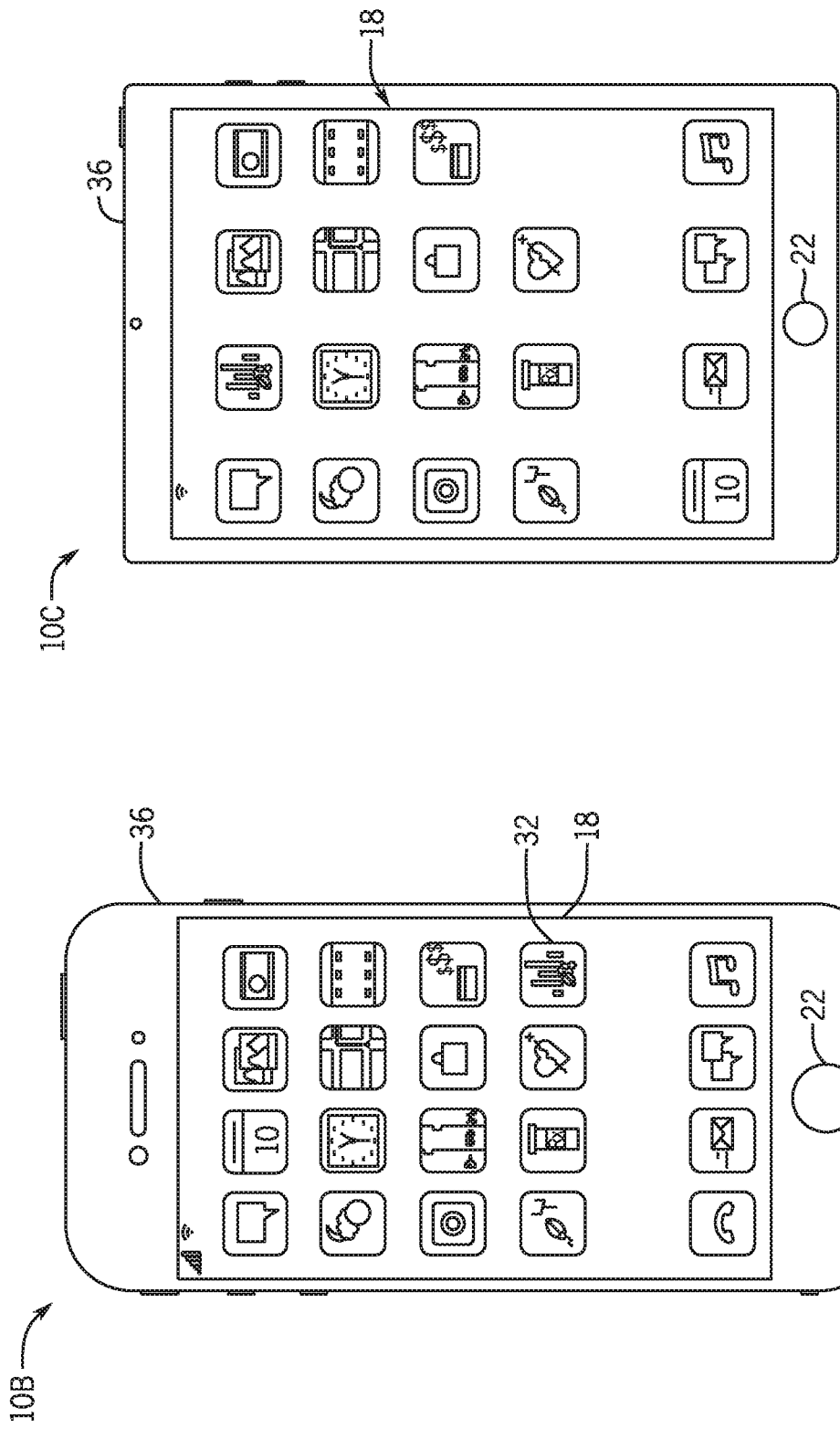

| | A | C | D | E | F | G | H | I | J | K | L | M |
|---|---|---|---|---|---|---|---|---|---|---|---|---|
| | CATEGORY | SYMBOL | COMPANY | SHORT / LONG | SHARES SOLD | PURCHASE PRICE | SALE PRICE | GROSS | PROFIT /LOSS | TAX RATE | TAX ON PROFIT | PROCEEDS AFTER TAX |
| 1 | ▼ 2012 | | | | | | | | | | | |
| 2 | | CWJ | CORNWELL JONES | SHORT | 10 | $263.08 | $288.12 | $2,881.20 | $250.40 | 20% | $50.08 | $2,831.12 |
| 3 | | YUD | YOUNGDIGITAL | SHORT | 20 | $142.02 | $148.03 | $2,960.68 | $120.28 | 20% | $24.06 | $2,936.62 |
| 4 | | YUD | YOUNGDIGITAL | SHORT | 10 | $142.02 | $186.27 | $1,862.70 | $442.50 | 20% | $88.50 | $1,774.20 |
| 5 | | FCM | FIREBREAK CONTENT MANAGEMENT | LONG | 6 | $173.05 | $178.13 | $1,068.80 | $30.50 | 15% | $4.57 | $1,064.23 |
| 6 | | ZZZ | ZIGGURAT | SHORT | 12 | $382.02 | $413.08 | $4,956.95 | $372.71 | 20% | $74.54 | $4,882.40 |
| 7 | ▼ 2013 | | | | | | | | | | | |
| 8 | | ZZZ | ZIGGURAT | SHORT | 5 | $382.02 | $432.03 | $2,160.16 | $250.06 | 20% | $50.01 | $2,110.15 |
| 9 | | MBM | MANHATTAN BUSINESS MATERIALS | LONG | 10 | $327.46 | $331.47 | $3,314.71 | $40.11 | 15% | $6.02 | $3,308.70 |
| 10 | | ZZZ | ZIGGURAT | SHORT | 15 | $382.02 | $386.03 | $5,790.48 | $60.18 | 20% | $12.04 | $5,778.45 |
| 11 | | ZZZ | ZIGGURAT | SHORT | 4 | $382.02 | $408.04 | $1,632.15 | $104.07 | 20% | $20.81 | $1,611.34 |
| 12 | | ZZZ | ZIGGURAT | SHORT | 8 | $382.02 | $397.03 | $3,176.25 | $120.09 | 20% | $24.02 | $3,152.23 |
| 13 | | YUD | YOUNGDIGITAL | LONG | 8 | $142.02 | $187.09 | $1,496.73 | $360.57 | 15% | $54.09 | $1,442.65 |
| 14 | | YUD | YOUNGDIGITAL | LONG | 8 | $142.02 | $170.52 | $1,364.16 | $228.00 | 15% | $34.20 | $1,329.96 |
| 15 | | CWJ | CORNWELL JONES | LONG | 16 | $263.08 | $260.12 | $4,161.90 | ($47.38) | | $0.00 | $4,161.90 |
| 16 | ▼ 2014 | | | | | | | | | | | |
| 17 | | CWJ | CORNWELL JONES | LONG | 5 | $263.08 | $279.13 | $1,395.63 | $80.23 | 15% | $12.03 | $1,383.59 |
| 18 | | YUD | YOUNGDIGITAL | LONG | 3 | $142.02 | $180.03 | $540.10 | $114.04 | 15% | $17.11 | $522.99 |
| 19 | | YUD | YOUNGDIGITAL | LONG | 4 | $142.02 | $169.35 | $677.41 | $109.33 | 15% | $16.40 | $661.01 |
| 20 | | WCI | WESTERN COMMERCIAL INC. | SHORT | 17 | $419.85 | $414.87 | $7,052.81 | ($84.64) | 20% | $0.00 | $7,052.81 |
| 21 | | WCI | WESTERN COMMERCIAL INC. | SHORT | 5 | $419.85 | $416.90 | $2,309.48 | $210.23 | 20% | $42.05 | $2,267.43 |
| 22 | | | | | 166 | | | $48,802.30 | $2,761.28 | | $530.52 | $48,271.78 |

FIG. 7

| | A | C | D | E | F | G | H | I | J | K | L | M |
|---|---|---|---|---|---|---|---|---|---|---|---|---|
| | DATA | | | | | | | | | | | |
| 1 | CATEGORY | SYMBOL | COMPANY | SHORT/LONG | SHARES SOLD | PURCHASE PRICE | SALE PRICE | GROSS | PROFIT/LOSS | TAX RATE | TAX ON PROFIT | PROCEEDS AFTER TAX |
| 2 | ▼ 2012 | | | | | | | | | | | |
| 3 | | CNJ | CORNWELL JONES | SHORT | 10 | $263.08 | $288.12 | $2,881.20 | $250.40 | 20% | $50.08 | $2,831.12 |
| 4 | | YID | YOUNGDIGITAL | SHORT | 20 | $142.02 | $148.03 | $2,960.68 | $120.28 | 20% | $24.06 | $2,936.62 |
| 5 | | YID | YOUNGDIGITAL | SHORT | 10 | $142.02 | $186.27 | $1,862.70 | $442.50 | 20% | $88.50 | $1,774.20 |
| 6 | | FCM | FIREBREAK CONTENT MANAGEMENT | LONG | 6 | $173.05 | $178.13 | $1,068.80 | $30.50 | 15% | $4.57 | $1,064.23 |
| 7 | | ZZZ | ZIGGURAT | SHORT | 12 | $382.02 | $413.08 | $4,956.95 | $372.71 | 20% | $74.54 | $4,882.40 |
| 8 | ▼ 2013 | | | | | | | | | | | |
| 9 | | ZZZ | ZIGGURAT | SHORT | 5 | $382.02 | $432.03 | $2,160.16 | $250.06 | 20% | $50.01 | $2,110.15 |
| 10 | | MBM | MANHATTAN BUSINESS MATERIALS | LONG | 10 | $327.46 | $331.47 | $3,314.71 | $40.11 | 15% | $6.02 | $3,308.70 |
| 11 | | ZZZ | ZIGGURAT | SHORT | 15 | $382.02 | $386.03 | $5,790.48 | $60.18 | 20% | $12.04 | $5,778.45 |
| 12 | | ZZZ | ZIGGURAT | SHORT | 4 | $382.02 | $408.04 | $1,632.15 | $104.07 | 20% | $20.81 | $1,611.34 |
| 13 | | ZZZ | ZIGGURAT | SHORT | 8 | $382.02 | $397.03 | $3,176.25 | $120.09 | 20% | $24.02 | $3,152.23 |
| 14 | | YID | YOUNGDIGITAL | LONG | 8 | $142.02 | $187.09 | $1,496.73 | $360.57 | 15% | $54.09 | $1,442.65 |
| 15 | | YID | YOUNGDIGITAL | LONG | 8 | $142.02 | $170.52 | $1,364.16 | $228.00 | 15% | $34.20 | $1,329.96 |
| 16 | | CNJ | CORNWELL JONES | LONG | 16 | $263.08 | $260.12 | $4,161.90 | ($47.38) | 15% | $0.00 | $4,161.90 |
| 17 | ▼ 2014 | | | | | | | | | | | |
| 18 | | CNJ | CORNWELL JONES | LONG | 5 | $263.08 | $279.13 | $1,395.63 | $80.23 | 15% | $12.03 | $1,383.59 |
| 19 | | YID | YOUNGDIGITAL | LONG | 3 | $142.02 | $180.03 | $540.10 | $114.04 | 15% | $17.11 | $522.99 |
| 20 | | YID | YOUNGDIGITAL | LONG | 4 | $142.02 | $169.35 | $677.41 | $109.33 | 15% | $16.40 | $661.01 |
| 21 | | WCI | WESTERN COMMERCIAL INC. | SHORT | 17 | $419.85 | $414.87 | $7,052.81 | ($84.64) | 20% | $0.00 | $7,052.81 |
| 22 | | WCI | WESTERN COMMERCIAL INC. | SHORT | 5 | $419.85 | $416.90 | $2,309.48 | $210.23 | 20% | $42.05 | $2,267.43 |
| 23 | | | | | 166 | | | $48,802.30 | $2,761.29 | | $530.52 | $48,271.78 |

FIG. 9A

| DATA | | | | | | | | | | | | |
|---|---|---|---|---|---|---|---|---|---|---|---|---|
| CATEGORY | SYMBOL | COMPANY | SHORT / LONG | SHARES SOLD | PURCHASE PRICE | SALE PRICE | GROSS | PROFIT / LOSS | TAX RATE | TAX ON PROFIT | PROCEEDS AFTER TAX |
| ▼ 2012 | | | | | | | | | | | |
| | CWJ | CORNWELL JONES | SHORT | 10 | $263.08 | $288.12 | $2,881.20 | $250.40 | 20% | $50.08 | $2,831.12 |
| | YUD | YOUNGDIGITAL | SHORT | 20 | $142.02 | $148.03 | $2,960.68 | $120.28 | 20% | $24.06 | $2,936.62 |
| | YUD | YOUNGDIGITAL | SHORT | 10 | $142.02 | $186.27 | $1,862.70 | $442.50 | 20% | $88.50 | $1,774.20 |
| | FCM | FIREBREAK CONTENT MANAGEMENT | LONG | 6 | $173.06 | $178.13 | $1,068.80 | $30.50 | 15% | $4.57 | $1,064.23 |
| | ZZZ | ZIGGURAT | SHORT | 12 | $382.02 | $413.08 | $4,956.95 | $372.71 | 20% | $74.54 | $4,882.40 |
| ▼ 2013 | | | | | | | | | | | |
| | ZZZ | ZIGGURAT | SHORT | 5 | $382.02 | $432.03 | $2,160.16 | $250.06 | 20% | $50.01 | $2,110.15 |
| | MBM | MANHATTAN BUSINESS MATERIALS | LONG | 10 | $327.46 | $333.47 | $3,334.71 | $40.11 | 15% | $6.02 | $3,308.70 |
| | ZZZ | ZIGGURAT | SHORT | 15 | $382.02 | $386.03 | $5,790.48 | $60.18 | 20% | $12.04 | $5,778.45 |
| | ZZZ | ZIGGURAT | SHORT | 4 | $382.02 | $408.04 | $1,632.15 | $104.07 | 20% | $20.81 | $1,611.34 |
| | ZZZ | ZIGGURAT | SHORT | 8 | $382.02 | $397.03 | $3,176.25 | $120.09 | 20% | $24.02 | $3,152.23 |
| | YUD | YOUNGDIGITAL | LONG | 8 | $142.02 | $187.09 | $1,496.73 | $360.57 | 15% | $54.09 | $1,442.65 |
| | YUD | YOUNGDIGITAL | LONG | 8 | $142.02 | $170.52 | $1,364.16 | $228.00 | 15% | $34.20 | $1,329.96 |
| | CWJ | CORNWELL JONES | LONG | 16 | $263.08 | $260.12 | $4,161.90 | ($47.38) | 15% | $0.00 | $4,161.90 |
| ▼ 2014 | | | | | | | | | | | |
| | CWJ | CORNWELL JONES | LONG | 5 | $263.08 | $279.13 | $1,395.63 | $80.23 | 15% | $12.03 | $1,383.59 |
| | YUD | YOUNGDIGITAL | LONG | 3 | $142.02 | $180.03 | $540.10 | $114.04 | 15% | $17.11 | $522.99 |
| | YUD | YOUNGDIGITAL | LONG | 4 | $142.02 | $169.35 | $677.41 | $109.33 | 15% | $16.40 | $661.01 |
| | WCI | WESTERN COMMERCIAL INC. | SHORT | 17 | $419.85 | $414.87 | $7,052.81 | ($84.64) | 20% | $0.00 | $7,052.81 |
| | WCI | WESTERN COMMERCIAL INC. | SHORT | 5 | $419.85 | $416.90 | $2,309.48 | $210.23 | 20% | $42.05 | $2,267.43 |
| | | | | 166 | | | $48,802.30 | $2,761.28 | | $530.52 | $48,271.78 |

FIG. 9B

| | DATA | | | | | | | | | | | |
|---|---|---|---|---|---|---|---|---|---|---|---|---|
| | A | C | D | E | F | G | H | I | J | K | L | M |
| 1 | CATEGORY | SYMBOL | COMPANY | SHORT / LONG | SHARES SOLD | PURCHASE PRICE | SALE PRICE | GROSS | PROFIT/LOSS | TAX RATE | TAX ON PROFIT | PROCEEDS AFTER TAX |
| 2 | ▼ 2012 | | | | | | | | | | | |
| 3 | | CWJ | CORNWELL JONES | SHORT | 10 | $263.08 | $288.12 | $2,881.20 | $250.40 | 20% | $50.08 | $2,831.12 |
| 4 | | YUD | YOUNGDIGITAL | SHORT | 20 | $142.02 | $148.03 | $2,960.68 | $120.28 | 20% | $24.06 | $2,935.62 |
| 5 | | YUD | YOUNGDIGITAL | SHORT | 10 | $142.02 | $186.27 | $1,862.70 | $442.50 | 20% | $88.50 | $1,774.20 |
| 6 | | FCM | FIREBREAK CONTENT MANAGEMENT | LONG | 6 | $173.05 | $178.13 | $1,068.80 | $30.50 | 15% | $4.57 | $1,064.23 |
| 7 | | ZZZ | ZIGGURAT | SHORT | 12 | $382.02 | $413.08 | $4,956.05 | $372.71 | 20% | $74.54 | $4,882.40 |
| 8 | ▼ 2013 | | | | | | | | | | | |
| 9 | | ZZZ | ZIGGURAT | SHORT | 5 | $382.02 | $432.03 | $2,160.16 | $250.06 | 20% | $50.01 | $2,110.15 |
| 10 | | MBM | MANHATTAN BUSINESS MATERIALS | LONG | 10 | $327.46 | $331.47 | $3,314.71 | $40.11 | 15% | $6.02 | $3,308.70 |
| 11 | | ZZZ | ZIGGURAT | SHORT | 15 | $382.02 | $386.03 | $5,790.48 | $60.18 | 20% | $12.04 | $5,778.45 |
| 12 | | ZZZ | ZIGGURAT | SHORT | 4 | $382.02 | $408.04 | $1,632.15 | $104.07 | 20% | $20.81 | $1,611.34 |
| 13 | | ZZZ | ZIGGURAT | SHORT | 8 | $382.02 | $397.03 | $3,176.25 | $120.09 | 20% | $24.02 | $3,152.23 |
| 14 | | YUD | YOUNGDIGITAL | LONG | 8 | $142.02 | $187.09 | $1,496.73 | $360.57 | 15% | $54.09 | $1,442.65 |
| 15 | | YUD | YOUNGDIGITAL | LONG | 8 | $142.02 | $170.52 | $1,364.16 | $228.00 | 15% | $34.20 | $1,329.96 |
| 16 | | CWJ | CORNWELL JONES | LONG | 16 | $263.08 | $262.12 | $4,161.90 | ($47.38) | 15% | $0.00 | $4,161.90 |
| 17 | ▼ 2014 | | | | | | | | | | | |
| 18 | | CWJ | CORNWELL JONES | LONG | 5 | $263.08 | $279.13 | $1,395.63 | $80.23 | 15% | $12.03 | $1,383.59 |
| 19 | | YUD | YOUNGDIGITAL | LONG | 3 | $142.02 | $180.03 | $540.10 | $114.04 | 15% | $17.11 | $522.99 |
| 20 | | YUD | YOUNGDIGITAL | LONG | 4 | $142.02 | $169.35 | $677.41 | $109.33 | 15% | $16.40 | $661.01 |
| 21 | | WCI | WESTERN COMMERCIAL INC. | SHORT | 17 | $419.85 | $414.87 | $7,052.81 | ($84.64) | 20% | $0.00 | $7,052.81 |
| 22 | | WCI | WESTERN COMMERCIAL INC. | SHORT | 5 | $419.85 | $416.90 | $2,309.48 | $210.23 | 20% | $42.05 | $2,267.43 |
| 23 | | | | | 166 | | | $48,802.30 | $2,761.28 | | $530.52 | $48,271.78 |

FIG. 9C

| | A | C | D | E | F | G | H | I | J | K | L | M |
|---|---|---|---|---|---|---|---|---|---|---|---|---|
| | DATA | | | | | | | | | | | |
| 1 | CATEGORY | SYMBOL | COMPANY | SHORT / LONG | SHARES SOLD | PURCHASE PRICE | SALE PRICE | GROSS PROFIT/LOSS | PROFIT/LOSS | TAX RATE | TAX ON PROFIT | PROCEEDS AFTER TAX |
| 2 | ▼ 2012 | | | | | | | | | | | |
| 3 | | CMJ | CORNWELL JONES | SHORT | 10 | $263.08 | $288.12 | $2,881.20 | $250.40 | 20% | $50.08 | $2,831.12 |
| 4 | | YUD | YOUNGDIGITAL | SHORT | 20 | $142.02 | $148.03 | $2,960.68 | $120.28 | 20% | $24.06 | $2,936.62 |
| 5 | | YUD | YOUNGDIGITAL | SHORT | 10 | $142.02 | $186.27 | $1,862.70 | $442.50 | 20% | $88.50 | $1,774.20 |
| 6 | | FCM | FIREBREAK CONTENT MANAGEMENT | LONG | 6 | $173.05 | $178.13 | $1,068.80 | $30.50 | 15% | $4.57 | $1,064.23 |
| 7 | | ZZZ | ZIGGURAT | SHORT | 12 | $382.02 | $413.08 | $4,956.95 | $372.71 | 20% | $74.54 | $4,882.40 |
| 8 | ▼ 2013 | | | | | | | | 80 | | | |
| 9 | | ZZZ | ZIGGURAT | SHORT | 5 | $382.02 | | | $250.06 | 20% | $50.01 | $2,110.15 |
| 10 | | MBM | MANHATTAN BUSINESS MATERIALS | LONG | 10 | $327.46 | | 82 | $40.11 | 15% | $6.02 | $3,308.70 |
| 11 | | ZZZ | ZIGGURAT | SHORT | 15 | $382.02 | AUTOMATIC<br>CATEGORY NAME<br>BLANK<br>SUBTOTAL<br>AVERAGE<br>MIN<br>MAX<br>COUNT<br>SHOW FUNCTION NAME | 83 | $60.19 | 20% | $12.04 | $5,778.45 |
| 12 | | ZZZ | ZIGGURAT | SHORT | 4 | $382.02 | | | $104.07 | 20% | $20.81 | $1,611.34 |
| 13 | | ZZZ | ZIGGURAT | SHORT | 8 | $382.02 | | | $120.09 | 20% | $24.02 | $3,152.23 |
| 14 | | YUD | YOUNGDIGITAL | LONG | 8 | $142.02 | | | $360.57 | 15% | $54.09 | $1,442.65 |
| 15 | | YUD | YOUNGDIGITAL | LONG | 8 | $142.02 | | | $228.00 | 15% | $34.20 | $1,329.96 |
| 16 | | CMJ | CORNWELL JONES | LONG | 16 | $263.08 | | | $47.38 | 15% | $0.00 | $4,161.90 |
| 17 | ▼ 2014 | | | | | | | | | | | |
| 18 | | CMJ | CORNWELL JONES | LONG | 5 | $263.08 | $279.13 | $1,395.63 | $80.23 | 15% | $12.03 | $1,383.59 |
| 19 | | YUD | YOUNGDIGITAL | LONG | 3 | $142.02 | $180.03 | $540.10 | $114.04 | 15% | $17.11 | $522.99 |
| 20 | | YUD | YOUNGDIGITAL | LONG | 4 | $142.02 | $169.35 | $677.41 | $109.33 | 15% | $16.40 | $661.01 |
| 21 | | WCI | WESTERN COMMERCIAL INC. | SHORT | 17 | $419.85 | $414.87 | $7,052.81 | ($84.64) | 20% | $0.00 | $7,052.81 |
| 22 | | WCI | WESTERN COMMERCIAL INC. | SHORT | 5 | $419.85 | $416.90 | $2,309.48 | $210.23 | 20% | $42.05 | $2,267.43 |
| 23 | | | | | 166 | | | $48,802.30 | $2,761.28 | | $530.52 | $48,271.78 |

| | A | C | D | E | F | G | H | I | J | K | L | M |
|---|---|---|---|---|---|---|---|---|---|---|---|---|
| | DATA | | | | | | | | | | | |
| | CATEGORY | SYMBOL | COMPANY | SHORT/LONG | SHARES SOLD | PURCHASE PRICE | SALE PRICE | GROSS PROFIT/LOSS | PROFIT/LOSS | TAX RATE | TAX ON PROFIT | PROCEEDS AFTER TAX |
| 1 | ▼ 2012 | | | | | | | | | | | |
| 2 | | CWJ | CORNWELL JONES | SHORT | 10 | $263.08 | $288.12 | $2,881.20 | $250.40 | 20% | $50.08 | $2,831.12 |
| 3 | | YUD | YOUNGDIGITAL | SHORT | 20 | $142.02 | $148.03 | $2,960.68 | $120.28 | 20% | $24.06 | $2,936.62 |
| 4 | | YUD | YOUNGDIGITAL | SHORT | 10 | $142.02 | $186.27 | $1,862.70 | $442.50 | 20% | $88.50 | $1,774.20 |
| 5 | | FCM | FIREBREAK CONTENT MANAGEMENT | LONG | 6 | $173.05 | $178.13 | $1,068.80 | $30.50 | 15% | $4.57 | $1,064.23 |
| 6 | | ZZZ | ZIGGURAT | SHORT | 12 | $382.02 | $413.08 | $4,956.95 | $372.71 | 20% | $74.54 | $4,882.40 |
| 7 | ▼ 2013 | | | | | | | | | | | |
| 8 | | ZZZ | ZIGGURAT | SHORT | 5 | $382.02 | | | $250.16 | 20% | $50.01 | $2,110.15 |
| 9 | | MBM | MANHATTAN BUSINESS MATERIALS | LONG | 10 | $327.46 | | | $40.11 | 15% | $6.02 | $3,308.70 |
| 10 | | ZZZ | ZIGGURAT | SHORT | 15 | $382.02 | | | $60.18 | 20% | $12.04 | $5,778.45 |
| 11 | | ZZZ | ZIGGURAT | SHORT | 4 | $382.02 | | | $104.07 | 20% | $20.81 | $1,611.34 |
| 12 | | ZZZ | ZIGGURAT | SHORT | 8 | $382.02 | | | $120.09 | 20% | $24.02 | $3,152.23 |
| 13 | | YUD | YOUNGDIGITAL | LONG | 8 | $142.02 | | | $360.57 | 15% | $54.09 | $1,442.65 |
| 14 | | YUD | YOUNGDIGITAL | LONG | 8 | $142.02 | | | $228.00 | 15% | $34.20 | $1,329.96 |
| 15 | | CWJ | CORNWELL JONES | LONG | 16 | $263.08 | | | ($47.38) | 15% | $0.00 | $4,161.90 |
| 16 | ▼ 2014 | | | | | | | | | | | |
| 17 | | CWJ | CORNWELL JONES | LONG | 5 | $263.08 | $279.13 | $1,395.63 | $80.23 | 15% | $12.03 | $1,383.59 |
| 18 | | YUD | YOUNGDIGITAL | LONG | 3 | $142.02 | $180.03 | $540.10 | $114.04 | 15% | $17.11 | $522.99 |
| 19 | | YUD | YOUNGDIGITAL | LONG | 4 | $142.02 | $169.35 | $677.41 | $109.33 | 15% | $16.40 | $661.01 |
| 20 | | YUD | YOUNGDIGITAL | LONG | 17 | $419.85 | $414.57 | $7,052.81 | ($84.64) | 15% | $0.00 | $7,052.81 |
| 21 | | WCI | WESTERN COMMERCIAL INC. | SHORT | 5 | $419.85 | $416.90 | $2,309.48 | $210.23 | 20% | $42.05 | $2,267.43 |
| 22 | | WCI | WESTERN COMMERCIAL INC. | SHORT | | | | | | | | |
| 23 | | | | | 166 | | | $48,802.30 | $2,761.28 | | $530.52 | $48,271.78 |

Popup menu (64):
- AUTOMATIC CATEGORY NAME (86)
- BLANK
- SUBTOTAL
- AVERAGE
- MIN
- MAX
- COUNT
- SHOW FUNCTION NAME (83)

FIG. 10C

| CATEGORY | SYMBOL | COMPANY | SHORT/LONG | SHARES SOLD | PURCHASE PRICE | SALE PRICE | GROSS PROFIT | GROSS PROFIT/LOSS | TAX RATE | TAX ON PROFIT | PROCEEDS AFTER TAX |
|---|---|---|---|---|---|---|---|---|---|---|---|
| ▼ 2012 | | | | | | | | | | | |
| | CNJ | CORNWELL JONES | SHORT | 10 | $263.08 | $288.12 | $2,881.20 | $250.40 | 20% | $50.08 | $2,831.12 |
| | YUD | YOUNGDIGITAL | SHORT | 20 | $142.02 | $148.03 | $2,960.68 | $120.28 | 20% | $24.06 | $2,936.62 |
| | YUD | YOUNGDIGITAL | SHORT | 10 | $142.02 | $186.27 | $1,862.70 | $442.50 | 20% | $88.50 | $1,774.20 |
| | FCM | FIREBREAK CONTENT MANAGEMENT | LONG | 6 | $173.05 | $178.13 | $1,068.80 | $30.50 | 15% | $4.57 | $1,064.23 |
| | ZZZ | ZIGGURAT | SHORT | 12 | $382.02 | $413.08 | $4,956.95 | $372.71 | 20% | $74.54 | $4,882.40 |
| ▼ 2013 | | | | | | | | | | | |
| | ZZZ | ZIGGURAT | SHORT | 5 | $382.02 | | | $250.06 | 20% | $50.01 | $2,110.15 |
| | MBM | MANHATTAN BUSINESS MATERIALS | LONG | 10 | $327.46 | AUTOMATIC CATEGORY NAME | | $40.11 | 15% | $6.02 | $3,308.70 |
| | ZZZ | ZIGGURAT | SHORT | 15 | $382.02 | BLANK ✓SUBTOTAL | 86 | $60.19 | 20% | $12.04 | $5,778.45 |
| | ZZZ | ZIGGURAT | SHORT | 4 | $382.02 | AVERAGE MIN | | $104.07 | 20% | $20.81 | $1,611.34 |
| | ZZZ | ZIGGURAT | SHORT | 8 | $382.02 | MAX COUNT | | $120.09 | 20% | $24.02 | $3,152.23 |
| | YUD | YOUNGDIGITAL | LONG | 8 | $142.02 | SHOW FUNCTION NAME | | $360.57 | 15% | $54.09 | $1,442.65 |
| | YUD | YOUNGDIGITAL | LONG | 8 | $142.02 | | | $228.00 | 15% | $34.20 | $1,329.96 |
| | CNJ | CORNWELL JONES | LONG | 16 | $263.08 | | | ($47.38) | 15% | $0.00 | $4,161.90 |
| ▼ 2014 | | | | | | | | | | | |
| | CNJ | CORNWELL JONES | LONG | 5 | $263.08 | $279.13 | $1,395.63 | $80.23 | 15% | $12.03 | $1,383.59 |
| | YUD | YOUNGDIGITAL | LONG | 3 | $142.02 | $180.03 | $540.10 | $114.04 | 15% | $17.11 | $522.99 |
| | YUD | YOUNGDIGITAL | LONG | 4 | $142.02 | $169.35 | $677.41 | $109.33 | 15% | $16.40 | $661.01 |
| | WCI | WESTERN COMMERCIAL INC. | SHORT | 17 | $419.85 | $414.87 | $7,052.81 | ($84.64) | 20% | $0.00 | $7,052.81 |
| | WCI | WESTERN COMMERCIAL INC. | SHORT | 5 | $419.85 | $416.90 | $2,309.48 | $210.23 | 20% | $42.05 | $2,267.43 |
| | | | | 166 | | | $48,802.30 | $2,761.28 | | $530.52 | $48,271.78 |

FIG. 10D

| | A | C | D | E | F | G | H | I | J | K | L | M |
|---|---|---|---|---|---|---|---|---|---|---|---|---|
| | CATEGORY | SYMBOL | COMPANY | SHORT / LONG | SHARES SOLD | PURCHASE PRICE | SALE PRICE | GROSS | PROFIT /LOSS | TAX RATE | TAX ON PROFIT | PROCEEDS AFTER TAX |
| 2 | ▼ 2012 | | | | | | | $13,730.32 | | | | |
| 3 | | CNJ | CORNWELL JONES | SHORT | 10 | $263.08 | $288.12 | $2,881.20 | $250.40 | 20% | $50.08 | $2,831.12 |
| 4 | | YUD | YOUNGDIGITAL | SHORT | 20 | $142.02 | $148.03 | $2,960.68 | $120.28 | 20% | $24.06 | $2,936.62 |
| 5 | | YUD | YOUNGDIGITAL | SHORT | 10 | $142.02 | $186.27 | $1,862.70 | $442.50 | 20% | $88.50 | $1,774.20 |
| 6 | | FCM | FIREBREAK CONTENT MANAGEMENT | LONG | 6 | $173.05 | $178.13 | $1,068.80 | $30.50 | 15% | $4.57 | $1,064.23 |
| 7 | | ZZZ | ZIGGURAT | SHORT | 12 | $382.02 | $413.08 | $4,956.95 | $372.71 | 20% | $74.54 | $4,882.40 |
| 8 | ▼ 2013 | | | | | | | $23,099.57 — 71 | | | | |
| 9 | | ZZZ | ZIGGURAT | SHORT | 5 | $382.02 | $432.03 | $2,160.16 | $250.06 | 20% | $50.01 | $2,110.15 |
| 10 | | MBM | MANHATTAN BUSINESS MATERIALS | LONG | 10 | $327.46 | $331.47 | $3,314.71 | $40.11 | 15% | $6.02 | $3,308.70 |
| 11 | | ZZZ | ZIGGURAT | SHORT | 15 | $382.02 | $386.03 | $5,790.48 | $60.18 | 20% | $12.04 | $5,778.45 |
| 12 | | ZZZ | ZIGGURAT | SHORT | 4 | $382.02 | $408.04 | $1,632.15 | $104.07 | 20% | $20.81 | $1,611.34 |
| 13 | | ZZZ | ZIGGURAT | SHORT | 8 | $382.02 | $397.03 | $3,176.25 | $120.09 | 20% | $24.02 | $3,152.23 |
| 14 | | YUD | YOUNGDIGITAL | LONG | 8 | $142.02 | $187.09 | $1,496.73 | $360.57 | 15% | $54.09 | $1,442.65 |
| 15 | | YUD | YOUNGDIGITAL | LONG | 8 | $142.02 | $170.52 | $1,364.16 | $228.00 | 15% | $34.20 | $1,329.96 |
| 16 | | CNJ | CORNWELL JONES | LONG | 16 | $263.08 | $260.12 | $4,161.90 | ($47.38) | 15% | $0.00 | $4,161.90 |
| 17 | ▼ 2014 | | | | | | | $11,975.42 | | | | |
| 18 | | CNJ | CORNWELL JONES | LONG | 5 | $263.08 | $279.13 | $1,395.63 | $80.23 | 15% | $12.03 | $1,383.59 |
| 19 | | YUD | YOUNGDIGITAL | LONG | 3 | $142.02 | $180.03 | $540.10 | $114.04 | 15% | $17.11 | $522.99 |
| 20 | | YUD | YOUNGDIGITAL | LONG | 4 | $142.02 | $169.35 | $677.41 | $109.33 | 15% | $16.40 | $661.01 |
| 21 | | WCI | WESTERN COMMERCIAL INC. | SHORT | 17 | $419.85 | $414.87 | $7,052.81 | ($84.64) | 20% | $0.00 | $7,052.81 |
| 22 | | WCI | WESTERN COMMERCIAL INC. | SHORT | 5 | $419.85 | $416.90 | $2,309.48 | $210.23 | 20% | $42.05 | $2,267.43 |
| 23 | | | | | 166 | | | $48,802.30 | $2,761.28 | | $530.52 | $48,271.78 |
| SUBTOTAL | $23,096.55 | | | | | | | | | | | |

| | A | C | D | E | F | G | H | I | J | K | L | M |
|---|---|---|---|---|---|---|---|---|---|---|---|---|
| 1 | DATA | | | | | | | | | | | |
| 2 | CATEGORY | SYMBOL | COMPANY | SHORT/LONG | SHARES SOLD | PURCHASE PRICE | SALE PRICE | GROSS | PROFIT/LOSS | TAX RATE | TAX ON PROFIT | PROCEEDS AFTER TAX |
| 3 | ▸ 2012 | | | | | | | | | | | |
| 4 | | CMJ | CORNWELL JONES | SHORT | 10 | $263.08 | $288.12 | $2,881.20 | $250.40 | 20% | $50.08 | $2,831.12 |
| 5 | | YUD | YOUNGDIGITAL | SHORT | 20 | $142.02 | $148.03 | $2,960.68 | $120.28 | 20% | $24.06 | $2,936.62 |
| 6 | | YUD | YOUNGDIGITAL | SHORT | 10 | $142.02 | $186.27 | $1,862.70 | $442.50 | 20% | $88.50 | $1,774.20 |
| 7 | | FCM | FIREBREAK CONTENT MANAGEMENT | LONG | 6 | $173.05 | $178.13 | $1,068.80 | $30.50 | 15% | $4.57 | $1,064.23 |
| 8 | | ZZZ | ZIGGURAT | SHORT | 12 | $382.02 | $413.08 | $4,956.95 | $372.71 | 20% | $74.54 | $4,882.40 |
| 9 | ▸ 2013 | | | | | | | | | | | |
| 10 | | ZZZ | ZIGGURAT | SHORT | 5 | $432.03 | $432.03 | $2,160.16 | $250.96 | 20% | $50.01 | $2,110.15 |
| 11 | | MBM | MANHATTAN BUSINESS MATERIALS | LONG | 10 | $327.46 | $331.47 | $3,314.71 | $40.11 | 15% | $6.02 | $3,308.70 |
| 12 | | ZZZ | ZIGGURAT | SHORT | 15 | $382.02 | $386.03 | $5,790.43 | $60.18 | 20% | $12.04 | $5,778.45 |
| 13 | | ZZZ | ZIGGURAT | SHORT | 4 | $382.02 | $408.04 | $1,632.15 | $104.07 | 20% | $20.81 | $1,611.34 |
| 14 | | ZZZ | ZIGGURAT | SHORT | 8 | $382.02 | $397.03 | $3,176.25 | $120.09 | 20% | $24.02 | $3,152.23 |
| 15 | | YUD | YOUNGDIGITAL | LONG | 8 | $142.02 | $187.09 | $1,496.73 | $360.57 | 15% | $54.09 | $1,442.65 |
| 16 | | YUD | YOUNGDIGITAL | LONG | 8 | $142.02 | $170.52 | $1,364.16 | $228.00 | 15% | $34.20 | $1,329.96 |
| 17 | | CMJ | CORNWELL JONES | LONG | 16 | $263.08 | $260.12 | $4,161.90 | ($47.38) | 15% | $0.00 | $4,161.90 |
| 18 | ▸ 2014 | | | | | | | | | | | |
| 19 | | CMJ | CORNWELL JONES | LONG | 5 | $263.08 | $279.13 | $1,395.63 | $80.23 | 15% | $12.03 | $1,383.59 |
| 20 | | YUD | YOUNGDIGITAL | LONG | 3 | $142.02 | $180.03 | $540.10 | $114.04 | 15% | $17.11 | $522.99 |
| 21 | | YUD | YOUNGDIGITAL | LONG | 4 | $142.02 | $169.35 | $677.41 | $109.33 | 15% | $16.40 | $661.01 |
| 22 | | WCI | WESTERN COMMERCIAL INC. | SHORT | 17 | $419.85 | $414.87 | $7,052.81 | ($84.64) | 20% | $0.00 | $7,052.81 |
| 23 | | WCI | WESTERN COMMERCIAL INC. | SHORT | 5 | $419.85 | $416.90 | $2,309.48 | $210.23 | 20% | $42.05 | $2,267.43 |
| | | | | | 166 | | | $48,802.30 | $2,761.28 | | $530.52 | $48,271.78 |

| VALUE | ANY VALUE OR COLLECTION CONTAINING ANY VALUES. |
|---|---|

| | A | C | D | E | F | G | H | I | J | K | L | M |
|---|---|---|---|---|---|---|---|---|---|---|---|---|
| 1 | CATEGORY | SYMBOL | COMPANY | SHORT / LONG | SHARES SOLD | PURCHASE PRICE | SALE PRICE | GROSS | GROSS PROFIT / LOSS | TAX RATE | TAX ON PROFIT | PROCEEDS AFTER TAX |
| 2 | ▼ 2012 | | | | | | | | | | 110 | |
| 3 | | CMJ | CORNWELL JONES | SHORT | 10 | $263.08 | $288.12 | $2,881.20 | $250.40 | 20% | $50.08 | $2,831.12 |
| 4 | | YJD | YOUNGDIGITAL | SHORT | 20 | $148.03 | $148.03 | $2,960.68 | $120.28 | 20% | $24.06 | $2,936.62 |
| 5 | | YJD | YOUNGDIGITAL | SHORT | 10 | $142.02 | $185.27 | $1,852.70 | $442.50 | 20% | $88.50 | $1,774.20 |
| 6 | | FCM | FIREBREAK CONTENT MANAGEMENT | LONG | 6 | $173.05 | $178.13 | $1,068.80 | $30.50 | 15% | $4.57 | $1,064.23 |
| 7 | | ZZZ | ZIGGURAT | SHORT | 12 | $382.02 | $413.08 | $4,956.96 | $372.71 | 20% | $74.54 | $4,882.40 |
| 8 | ▼ 2013 | | | | | | | | | | | |
| 9 | | ZZZ | ZIGGURAT | SHORT | 5 | $382.02 | $432.03 | $2,160.16 | $250.06 | 20% | $50.01 | $2,110.15 |
| 10 | | MBM | MANHATTAN BUSINESS MATERIALS | LONG | 10 | $327.46 | $331.47 | $3,314.71 | $40.11 | 15% | $6.02 | $3,308.70 |
| 11 | | ZZZ | ZIGGURAT | SHORT | 15 | $382.02 | $386.03 | $5,790.48 | $60.18 | 20% | $12.04 | $5,778.45 |
| 12 | | ZZZ | ZIGGURAT | SHORT | 4 | $382.02 | $408.04 | $1,632.15 | $104.07 | 20% | $20.81 | $1,611.34 |
| 13 | | ZZZ | ZIGGURAT | SHORT | 8 | $382.02 | $397.03 | $3,176.25 | $120.09 | 20% | $24.02 | $3,152.23 |
| 14 | | YJD | YOUNGDIGITAL | LONG | 8 | $142.02 | $187.09 | $1,496.73 | $360.57 | 15% | $54.09 | $1,442.65 |
| 15 | | YJD | YOUNGDIGITAL | LONG | 8 | $142.02 | $170.52 | $1,364.16 | $228.00 | 15% | $34.20 | $1,329.96 |
| 16 | | CMJ | CORNWELL JONES | LONG | 16 | $263.08 | $260.12 | $4,161.90 | ($47.38) | 15% | $0.00 | $4,161.90 |
| 17 | ▼ 2014 | | | | | | | | | | | |
| 18 | | CMJ | CORNWELL JONES | LONG | 5 | $263.08 | $279.13 | $1,395.63 | $80.23 | 15% | $12.03 | $1,383.59 |
| 19 | | YJD | YOUNGDIGITAL | LONG | 3 | $142.02 | $180.03 | $540.10 | $114.04 | 15% | $17.11 | $522.99 |
| 20 | | YJD | YOUNGDIGITAL | LONG | 4 | $142.02 | $169.35 | $677.41 | $109.33 | 15% | $16.40 | $661.01 |
| 21 | | WCI | WESTERN COMMERCIAL INC. | SHORT | 17 | $419.85 | $414.87 | $7,052.81 | ($84.64) | 15% | $0.00 | $7,052.81 |
| 22 | | WCI | WESTERN COMMERCIAL INC. | SHORT | 5 | $419.85 | $416.90 | $2,309.48 | $210.23 | 20% | $42.05 | $2,267.43 |
| 23 | | | | | 166 | | | $46,802.30 | $2,761.28 | | $530.52 | $46,271.78 |

=IF LOOKUP ▼ ( MAX ▼ ( ) )

FIG. 15

| | A | C | D | E | F | G | H | J | K | L | M |
|---|---|---|---|---|---|---|---|---|---|---|---|
| | CATEGORY | SYMBOL | COMPANY | SHORT / LONG | SHARES SOLD | PURCHASE PRICE | SALE PRICE | GROSS PROFIT/LOSS | TAX RATE | TAX ON PROFIT | PROCEEDS AFTER TAX |
| 2 | ▼2012 | | | | | | | 12 SHARES OF ZZZ | | | |
| 3 | | CMJ | CORNWELL JONES | SHORT | 10 | $263.08 | $288.12 | $2,881.20 | 20% | $50.08 | $2,831.12 |
| 4 | | YUD | YOUNGDIGITAL | SHORT | 20 | $142.02 | $148.03 | $2,960.68 | 20% | $24.06 | $2,936.62 |
| 5 | | YUD | YOUNGDIGITAL | SHORT | 10 | $142.02 | $186.27 | $1,862.70 | 20% | $88.50 | $1,774.20 |
| 6 | | FCM | FIREBREAK CONTENT MANAGEMENT | LONG | 6 | $173.05 | $178.13 | $1,068.80 | 15% | $4.57 | $1,064.23 |
| 7 | | ZZZ | ZIGGURAT | SHORT | 12 | $382.02 | $413.08 | $4,956.95 | 20% | $74.54 | $4,882.40 |
| 8 | | | | | | | | | | | |
| 9 | ▼2013 | | | | | | | 15 SHARES OF ZZZ | | | |
| 10 | | ZZZ | ZIGGURAT | SHORT | 5 | $382.02 | $432.03 | $2,160.16 | 20% | $50.01 | $2,110.15 |
| 11 | | MBM | MANHATTAN BUSINESS MATERIALS | LONG | 10 | $327.46 | $331.47 | $3,314.71 | 15% | $6.02 | $3,308.70 |
| 12 | | ZZZ | ZIGGURAT | SHORT | 15 | $382.02 | $386.03 | $5,790.48 | 20% | $12.04 | $5,778.45 |
| 13 | | ZZZ | ZIGGURAT | SHORT | 4 | $382.02 | $408.04 | $1,632.15 | 20% | $20.81 | $1,611.34 |
| 14 | | ZZZ | ZIGGURAT | SHORT | 8 | $382.02 | $397.03 | $3,176.25 | 20% | $24.02 | $3,152.23 |
| 15 | | YUD | YOUNGDIGITAL | LONG | 8 | $142.02 | $187.09 | $1,496.73 | 15% | $54.09 | $1,442.65 |
| 16 | | YUD | YOUNGDIGITAL | LONG | 8 | $142.02 | $170.52 | $1,364.16 | 15% | $34.20 | $1,329.96 |
| 17 | | CMJ | CORNWELL JONES | LONG | 16 | $263.08 | $260.12 | ($47.36) | 15% | $0.00 | $4,161.90 |
| 18 | ▼2014 | | | | | | | 17 SHARES OF WCI | | | |
| 19 | | CMJ | CORNWELL JONES | LONG | 5 | $263.08 | $279.13 | $1,395.63 | 15% | $12.03 | $1,383.59 |
| 20 | | YUD | YOUNGDIGITAL | LONG | 3 | $142.02 | $180.03 | $540.10 | 15% | $17.11 | $522.99 |
| 21 | | YUD | YOUNGDIGITAL | LONG | 4 | $142.02 | $169.35 | $677.41 | 15% | $16.40 | $661.01 |
| 22 | | WCI | WESTERN COMMERCIAL INC. | SHORT | 17 | $419.85 | $414.87 | $7,052.81 | 20% | $0.00 | $7,052.81 |
| 23 | | WCI | WESTERN COMMERCIAL INC. | SHORT | 5 | $419.85 | $416.90 | $2,309.48 | 20% | $42.05 | $2,267.43 |
| | | | | | 166 | | | $48,802.30 | | $530.52 | $48,271.78 |

CUSTOM | 15 SHARES OF ZZZ

CUSTOM SUMMARIZATION IN CATEGORIES

BACKGROUND

The present disclosure relates generally to techniques for utilizing custom summary functions for a summary cell in a table of a spreadsheet application.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various types of applications, such as spreadsheet applications, presentation applications, and word processing applications, may allow a user to generate and display data in the form of tables that includes rows and columns of cells. For example, a user may generate a table using a spreadsheet application in order to analyze a set of quantitative or qualitative data. To facilitate in the analysis of data, a user may also organize the data by categorizing or grouping the cell data based on data commonalities. Moreover, the application may allow the user to generate a summary cell that summarizes the organized data using a summary function. Often, a summary cell formula includes a predefined summary function within the application, such as functions that mathematically manipulate a set of values including subtotal, average, minimum, maximum, and the like. For example, a mathematical function used to summarize the data for the summary cell of a table may provide a value indicating the mathematical computation for the set of organized data cells.

However, since the summary function may be predefined, the summary formula options may be limited and dependent on the application (e.g., application package provided by a manufacturer). Unfortunately, the predefined summary functions may be inadequate for a user analyzing data beyond the limitations of the functions, such as the mathematical functions provided by the application.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments described herein are related to facilitating the use of custom summary functions for a summary cell providing a summary for an organized set of data. After organizing cells of a spreadsheet table, a summary cell may be used to provide a summary for a set of the organized cells. The summary cell may provide the summary based on a predefined summary function (e.g., a mathematical function). However, the predefined summary function options may not efficiently or effectively summarize the set of organized cells for each user. In one such example, the summary function for the summary cell may be edited in an advanced editing mode, such that the function and its parameters may be modified by a user. In this manner, the summary function may be customized to provide a suitable summary for a particular analysis of the data.

In another embodiment, summary cells for other sets of organized cells on the spreadsheet table may be automatically updated with a corresponding customized summary function upon the customization of the first summary cell. The automatic update of other summary cells may occur for summary cells in the same category of data, such as the same column of the table. In this manner, the updated summary cells do not have to be modified manually to provide the corresponding custom summary for their respective sets of organized data.

BRIEF DESCRIPTION OF THE DRAWINGS

Various aspects of this disclosure may be better understood upon reading the following detailed description and upon reference to the drawings in which:

FIG. 3 is a front view of a handheld device representing another embodiment of the electronic device of FIG. 1, in accordance with an embodiment of the present disclosure;

FIG. 4 is a front view of a hand-held tablet device representing another embodiment of the electronic device of FIG. 1 in accordance with an embodiment of the present disclosure;

FIG. 7 is a block diagram of a table of a spreadsheet application with the table data organized based on a commonality, in accordance with an embodiment of the present disclosure;

FIG. 9A is a block diagram of the organized table of FIG. 7 with a request to edit a summary function of a summary cell, in accordance with an embodiment of the present disclosure;

FIG. 9B is a block diagram of a drop down arrow in response to the request to edit the summary function of the summary cell of FIG. 9A, in accordance with an embodiment of the present disclosure;

FIG. 9C is a block diagram of a request to view summarization options using the drop down arrow of FIG. 9B, in accordance with an embodiment of the present disclosure;

FIG. 10A is a block diagram of the summarization options in a summary function dialog box as a result of the request to view summarization options, in accordance with an embodiment of the present disclosure;

FIG. 10B is a block diagram of a request to change a summary function in the summarization options of FIG. 10A, in accordance with an embodiment of the present disclosure;

FIG. 10C is a block diagram of the selected summary option as a result of the request to change the summary function of FIG. 10B, in accordance with an embodiment of the present disclosure;

FIG. 10D is a block diagram of the summary cell providing a summary using the updated summary function of FIG. 10C, in accordance with an embodiment of the present disclosure;

FIG. 11A is a block diagram of a request to edit the summary function for a summary cell, in accordance with an embodiment of the present disclosure;

FIG. 11B is a block diagram of a formula box as a result of the request to edit the summary options of the summary cell of FIG. 11A, in accordance with an embodiment of the present disclosure;

FIG. 11C is a block diagram of an editable field in the formula box of FIG. 11B, in accordance with an embodiment of the present disclosure;

FIG. 12B is a block diagram of selecting a function for setting a first sub-parameter of the customized function of FIG. 12A, in accordance with an embodiment of the present disclosure;

FIG. 12C is a block diagram of selecting a column for setting the range for the first sub-parameter of the customized function of FIG. 12B, in accordance with an embodiment of the present disclosure;

FIG. 12D is a block diagram of the formula box updated based on the setting of the first sub-parameter of the customized function of FIG. 12C, in accordance with an embodiment of the present disclosure;

FIG. 13A is a block diagram of setting a second sub-parameter of the customized function of FIG. 12A, in accordance with an embodiment of the present disclosure;

FIG. 13B is a block diagram of selecting a column value for setting the second sub-parameter of the customized function of FIG. 13A, in accordance with an embodiment of the present disclosure;

FIG. 13C is a block diagram of the formula box updated based on setting the second sub-parameter of the customized function of FIG. 13B, in accordance with an embodiment of the present disclosure;

FIG. 14A is a block diagram of a third sub-parameter of the customized function of FIG. 12A, in accordance with an embodiment of the present disclosure;

FIG. 14B is a block diagram of selecting a column value for setting the third sub-parameter of FIG. 12B, in accordance with an embodiment of the present disclosure;

FIG. 15 is a block diagram of the updated formula box updated based on the edited and selected parameters of the customized function of FIG. 12A, in accordance with an embodiment of the present disclosure;

FIG. 16 is a block diagram of an updated summary provided by the customized summary cell, in accordance with an embodiment of the present disclosure;

FIG. 18 is a block diagram of an indication of relevant subsets of data used for parameters of a customized function and updated summary cells, in accordance with an embodiment of the present disclosure.

DETAILED DESCRIPTION OF SPECIFIC EMBODIMENTS

Figure 1:
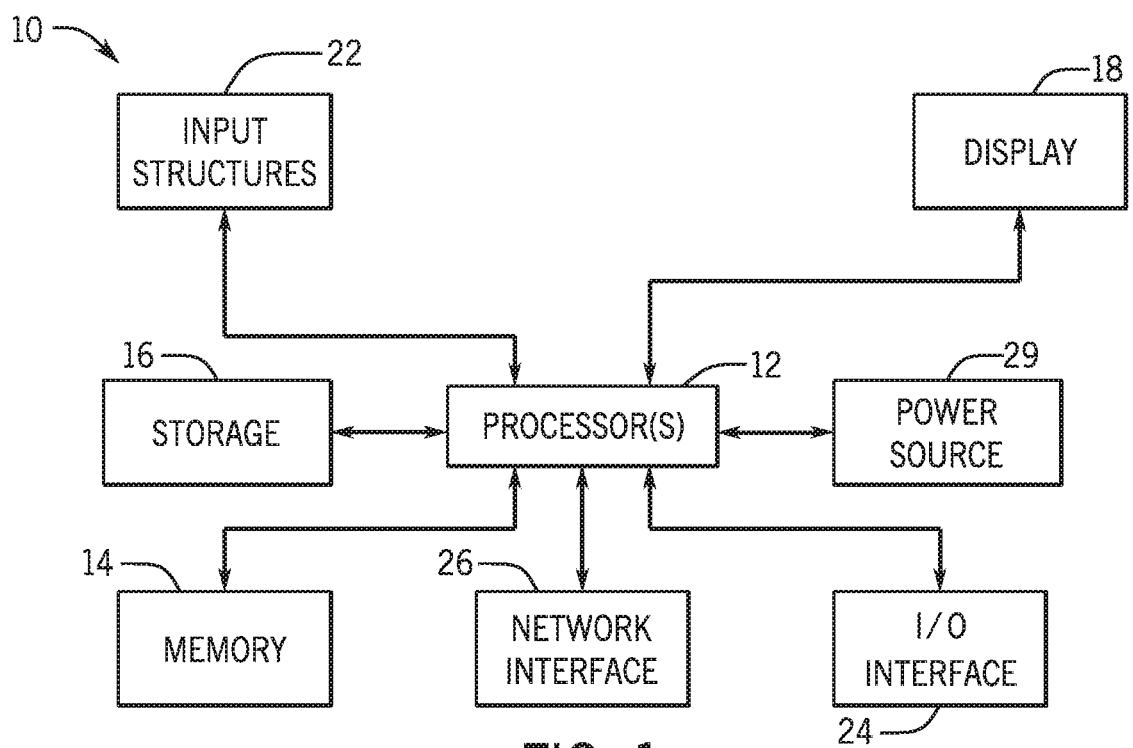
FIG. 1 is a block diagram of an electronic device that may benefit from modifying a summary cell for a set of organized data, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. In some embodiments, it should be understood that references to "one embodiment" or "an embodiment" of the present disclosure are not intended to be interpreted as excluding the existence of additional embodiments that also incorporate the recited features.

The present disclosure is generally directed to enable modifying and customization of summary functions and formulas, such as formulas used to implement one or more defined functions, to provide a summary for a set/sets of data. The ability to edit summary functions may improve the type of quantitative or qualitative analysis typically performed for a set of data.

As discussed herein, in certain implementations, the customization of summary functions in a formula for a summary cell may include modifying a summary function type and its parameters, such that different types of functions (e.g., statistical, mathematical, etc.) and its parameters may be selected based on the type of data analysis to be performed for the set of data. For example, rather than viewing a summary subtotal (e.g., value provided by the SUM function), which may be the default summary function used for a summary cell, a user may change the summary formula for the set of organized data to include one or more functions (e.g., MAX, MIN, COUNT, LOOKUP, etc.), such that the functions may be customized summary functions rather than merely a set of predefined summary function options. Moreover, the parameters for the function may be edited to reference particular subsets of cells or columns of cells. Further, the customization may include using text in conjunction with the modified summary function. In certain embodiments, the customization of a summary cell within a particular category, such as a column, may result in updating each of the other summary cells within the column for their respective sets of organized data. The updating of summary cells for each of the other sets of organized data may be performed algorithmically based in part on the generation of the custom summary cell in the same column.

With the foregoing in mind, a general description of a variety of suitable electronic devices may employ the techniques described herein to provide a customized summary using a modifiable summary function for a set of organized or grouped cells. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including computer code stored on a non-transitory computer-readable medium) or a combination of both hardware and software elements. It should be noted that FIG. 1 is merely one example of a particular implementation and is intended to illustrate the types of components that may be present in the electronic device 10.

Figure 2:
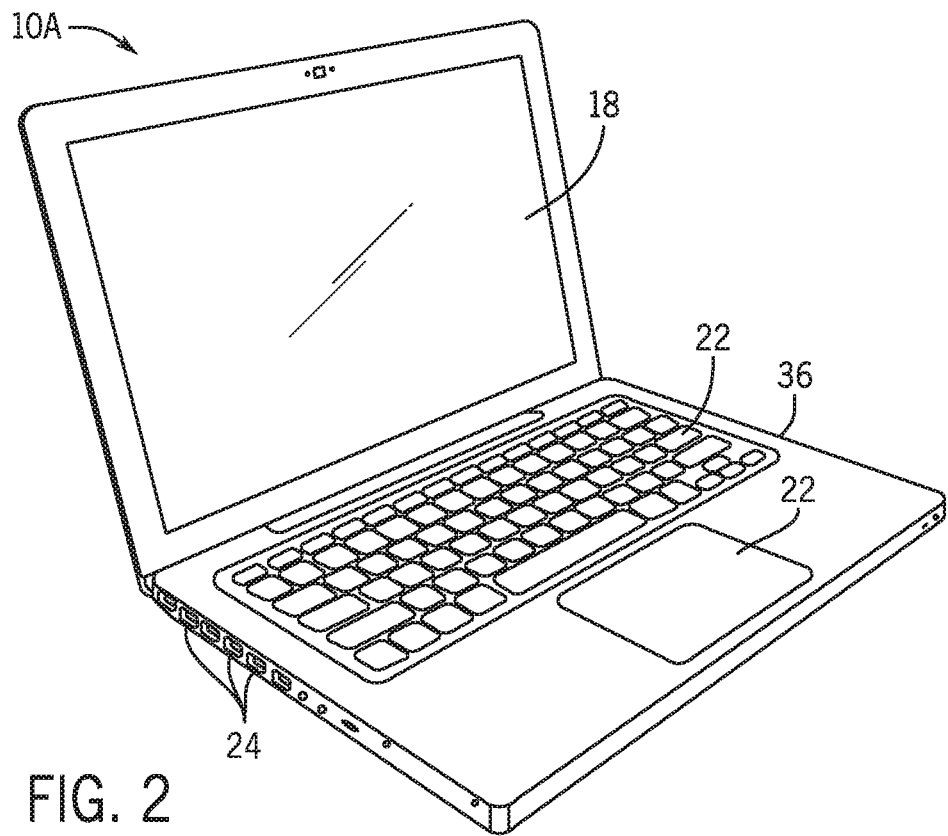
FIG. 2 is a perspective view of a notebook computer representing an embodiment of the electronic device of FIG. 1, in accordance with an embodiment of the present disclosure.
Figure 5:
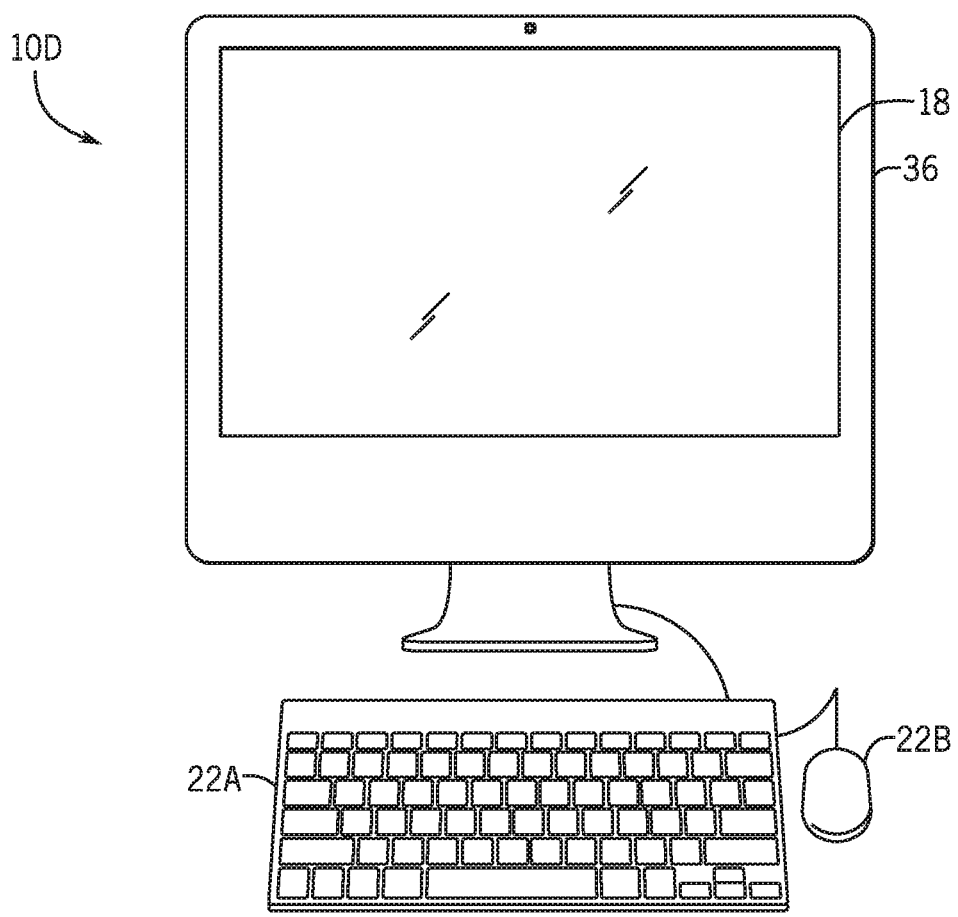
FIG. 5 is a front view of a desktop computer representing another embodiment of the electronic device of FIG. 1, in accordance with an embodiment of the present disclosure.
Figure 6:
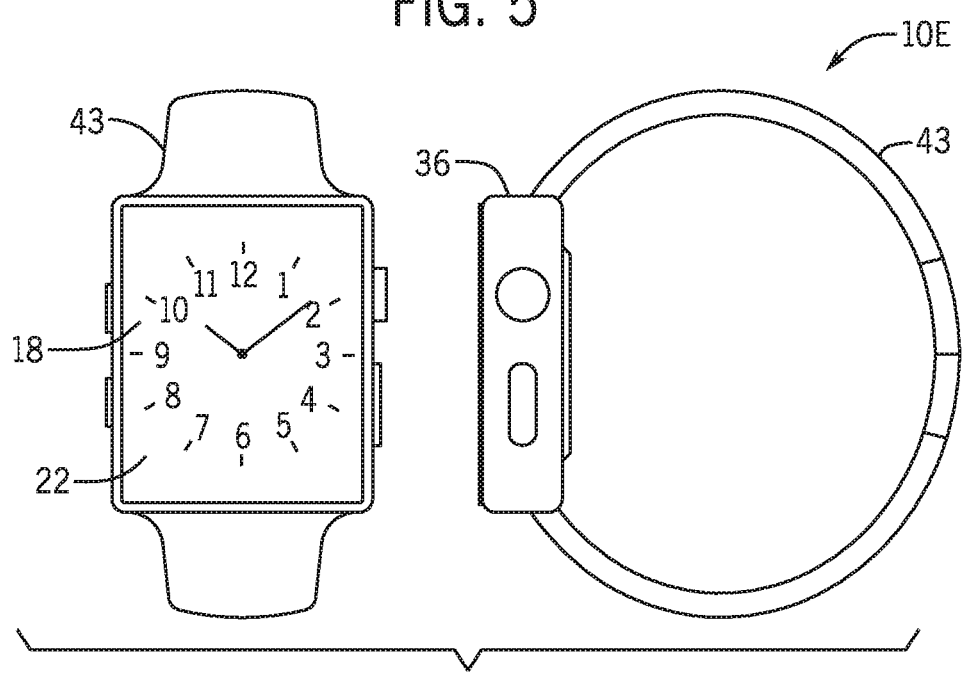
FIG. 6 is a front view and side view of a wearable electronic device representing another embodiment of the electronic device of FIG. 1, in accordance with an embodiment of the present disclosure.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as machine-readable instructions (e.g., software or firmware), hardware, or any combination thereof. Furthermore, the data processing circuitry may be separate components, components of a single contained processing module (e.g., a system-on-a-chip device), or may be incorporated wholly or partially within any of the other elements within the electronic device 10.

In the electronic device 10 of FIG. 1, the display 18 may be any suitable electronic display used to display image data (e.g., a liquid crystal display (LCD) or an organic light emitting diode (OLED) display). In some examples, the display 18 may represent one of the input structures 22, enabling users to interact with a user interface of the electronic device 10. In some embodiments, the electronic display 18 may be a MultiTouch™ display that may detect multiple touches at once. Other input structures 22 of the electronic device 10 may include buttons, keyboards, mice, trackpads, and the like. The I/O interface 24 may enable electronic device 10 to interface with various other electronic devices (e.g., pressing a button to increase or decrease a volume level), as may the network interface 26.

The network interface 26 may include, for example, one or more interfaces for a personal area network (PAN), such as a Bluetooth network, for a local area network (LAN), such as an 802.11x Wi-Fi network, and/or for a wide area network (WAN), such as a 4G or LTE cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth.

The processor(s) 12 and/or other data processing circuitry may execute instructions and/or operate on data stored in the memory 14 and/or nonvolatile storage 16. In some embodiments, the processor(s) 12 of the electronic device 10 of FIG. 1 may be operably coupled with the memory 14 and the nonvolatile storage 16 to facilitate the use of the processors(s) 12 to implement various stored algorithms. As discussed herein, the algorithms may include algorithms to enable an advanced editing mode to customize a summary function and to provide a customized summary based on the edited summary function for a set of organized data. Additional algorithms may include an algorithm to update formulas with custom summary functions for summary cells referencing other sets of organized data on the table, such that the updating is based on the first modified summary cell for a set of organized data. Such programs or instructions executed by the processor(s) 12 may be stored in any suitable article of manufacture that includes one or more tangible, computer-readable media at least collectively storing the instructions or routines, such as the memory 14 and the nonvolatile storage 16. In another embodiment, the processor(s) 12 may receive an indication of a user-selected commonality or category (e.g., data pertaining to a year, such as 2012, 2013, and so forth) for grouping cells, for example, by the input structures 22. The processor(s) 12 may select the categorization and update cell arrangement on the table based upon this indication.

The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities. By way of example, a computer program product containing the instructions may include an operating system (e.g., OS X® or iOS by Apple Inc.) or an application program (e.g., Numbers®, Pages®, or Keynote® by Apple Inc.) or a suite of such application programs (e.g., iWork® by Apple Inc.).

As further illustrated, the electronic device 10 may include a power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface (e.g., spreadsheet) displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif.

The handheld device 10B may include an enclosure 36 to protect interior components from physical damage and to shield them from electromagnetic interference. The enclosure 36 may surround the display 18, which may display a graphical user interface (GUI) having an array of icons 32. By way of example, one of the icons 32 may launch a spreadsheet application program (e.g., Numbers® by Apple Inc.). User input structures 22, in combination with the display 18, may allow a user to control the handheld device 10B. For example, the input structures 22 may activate or deactivate the handheld device 10B, navigate a user interface to a home screen, navigate a user interface to a user-configurable application screen, activate a voice-recognition feature, provide volume control, and toggle between vibrate and ring modes. Touchscreen features of the display 18 of the handheld device 10B may provide a simplified approach to controlling the spreadsheet application program. The handheld device 10B may include I/O interface 24 that opens through the enclosure 36. The I/O interface 24 may include, for example, an audio jack and/or a Lightning® port from Apple Inc. to connect to external devices, such as speakers and/or headphones.

FIG. 4 depicts a front view of a handheld tablet device 10C, which represents another embodiment of the electronic device 10. The handheld tablet device 10C may represent, for example, a tablet computer, or one of various portable computing devices. By way of example, the handheld tablet device 10C may be a tablet-sized embodiment of the electronic device 10, which may be, for example, a model of an iPad® available from Apple Inc. of Cupertino, California. The handheld tablet device 10C may also include an enclosure 36 that holds the electronic display 18. Input structures 22 may include, for example, a hardware or virtual home button.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D. In one embodiment, the input structures 22 (e.g., a keyboard and/or touchpad) may be used to interact with the computer 10D, such as to start, control, or operate a GUI or applications (e.g., Numbers® by Apple Inc.) running on the computer 10D.

Similarly, FIG. 6 depicts a wearable electronic device 10E representing another embodiment of the electronic device 10 of FIG. 1 that may be operate using the techniques described herein. By way of example, the wearable electronic device 10E, which may include a wristband 43, may be an Apple Watch® by Apple, Inc. More generally, the wearable electronic device 10E may be any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Electronic devices 10A, 10B, 10C, 10D, and 10E described above may each use a spreadsheet application with a summary cell that may be customized by modifying or editing the summary function of the summary formula to provide a user defined summary for a set of organized data. In some embodiments, the custom summary cell for a particular set of organized cells may generate an update to other summary cells in the same category (e.g., same column of the table) with corresponding custom summary functions for their respective sets of organized cells.

With the preceding in mind, a variety of computer program products, such as applications and/or operating systems executing on an electronic device 10, may use or implement the techniques discussed below to enhance the user experience on the electronic device 10. While the following examples are provided in the context of a spreadsheet application, the present approaches are suitable for use in other applications (e.g., word processing applications, presentation applications, address book or contact list applications, media storing or playback applications, and so forth) where tables of data may be created, displayed, and updated.

For example, an electronic device 10 may store and run a spreadsheet application (e.g., Numbers® from Apple Inc.) or other suitable application configured to implement the custom summary function for a summary cell of a set of organized data and to correspondingly update other summary cells within the same grouping (e.g., column of data organized by a particular category). The application may be stored as one or more executable routines (which may encode and implement the actions described below) in memory and/or storage of FIG. 1. These routines, when executed, may cause the electronic device 10 to render summary cells as editable to facilitate in the customization of the summary provided by the summary cell for its set of organized data in accordance with the techniques described herein.

Turning now to a discussion of data of a table that may be organized and may include a summary cell to present a summary for the organized data, FIG. 7 illustrates a block diagram depicting a spreadsheet application, which includes a table 50 having rows 52 and columns 54 of cells. In the depicted example, the table 50 is populated by a set of data related to financial and business data, though examples of other suitable data may include sports data, demographic data, medical data, or any other type of data.

In some implementations, the spreadsheet may include an organization interface (not explicitly shown), such as buttons, menus, drop down boxes, and so forth, that may allow a user to interact and invoke various functions within the spreadsheet application. Such functions may include enabling filtering or grouping of data in rows 52 and/or columns 54 of table 50. The grouping may include organizing the data numerically, alphabetically, or based on a commonality. In the depicted spreadsheet, the data of table 50 has been organized or grouped by a commonality of "Category." Thus, the cells of table 50 are organized by category (e.g., years 2012, 2013, 2014, etc.). However, in other implementations, the table 50 may be organized or reorganized by other commonalities, such as by other values of header row 57 including "Symbol," "Company," "Short/Long," "Shares Sold," "Purchase Price," "Sale Price," "Gross" profit, "Profit/Loss," "Tax Rate," "Tax on Profit," or "Proceeds After Tax." After the cell data of table 50 has been organized, such as by category of year, a user may enable a summary cell to provide a summary for each of the categorized sets of organized data.

Figure 8:
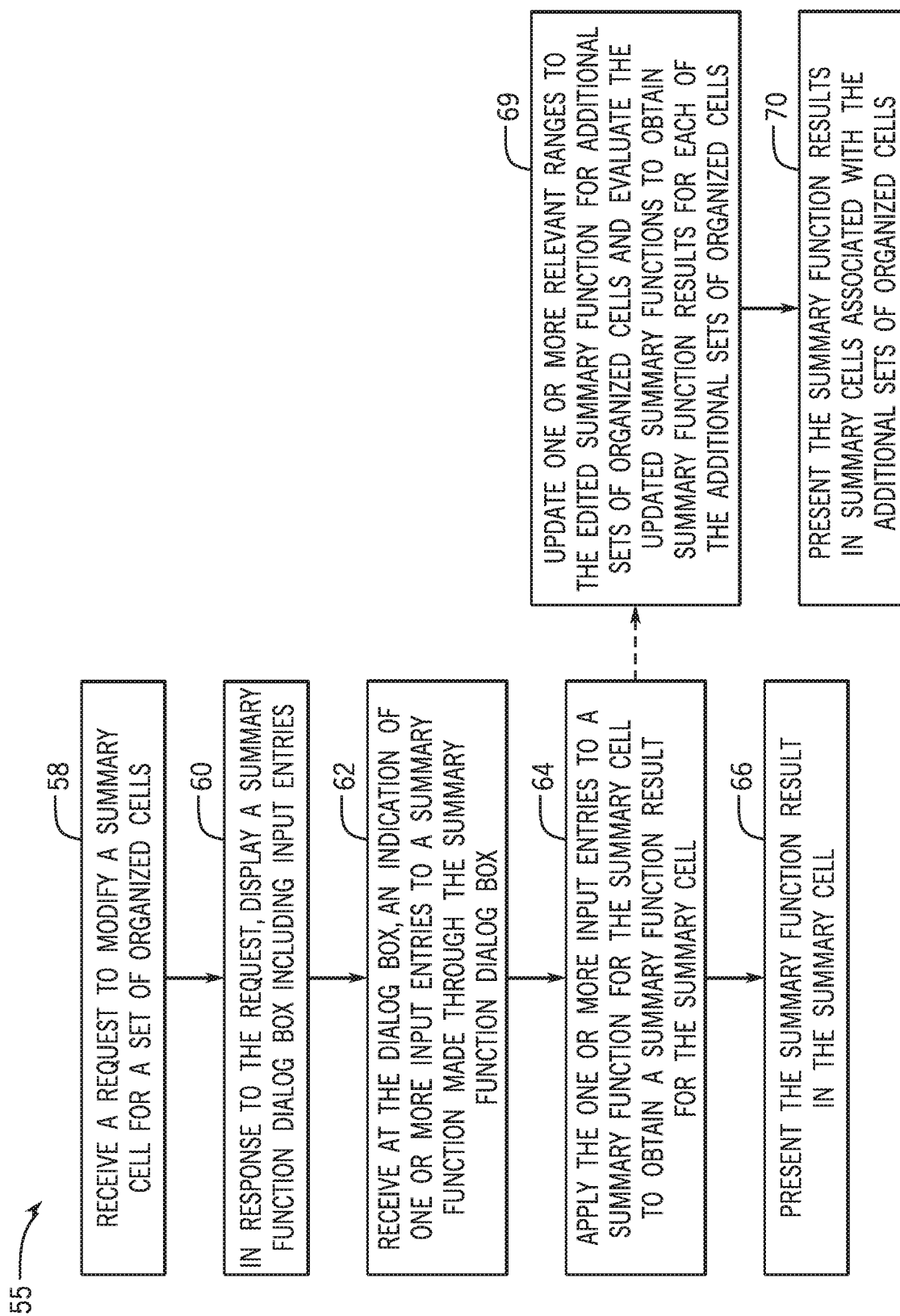
FIG. 8 is a process flow diagram, illustrating a process for customizing a summary cell, in accordance with an embodiment of the present disclosure.

Turning now to a more detailed discussion of a summary cell that may provide a summary for a set of organized data that may benefit from customization of the summary provided, process 55 flow diagram of FIG. 8 illustrates customizing a summary cell. In one embodiment, a table 50 with sets of organized data (e.g., by a year) may be initially present or displayed on an application (e.g., spreadsheet application). The table 50 may include a summary cell or an option to generate a summary cell for each set of organized cells. The process may include receiving (block 58) a request to modify a summary cell for a set of organized cells.

To illustrate, FIG. 9A depicts the organized table 50 with a user requesting to generate a summary cell. As shown, organized table 50 may include an organization header indicating the unique category value pertaining to the set of data. By way of example, and as depicted, a first group header 51 may be used to indicate summary values, for its particular set of organized data (e.g., rows of data related to the year 2012). Similarly, a second group header 53 may indicate summary values of year 2013 and a third group header 59 may indicate summary values of year 2014 for their respective sets of organized data. Within the row group headers 51, 53, 59, each column 54 of the sets of organized data may include a summary cell 68 that provides a summary of the organized data within the context of a column. By way of example, a customized summary cell 71 (e.g., a summary cell 68 that may be customized using techniques described herein) may provide a summary for subset 63 of cells (I9-I16) of the set of organized cells for 2013.

To generate a summary formula for summary cell 68, a user may select 64 (such as by using a mouse, touch screen, or other suitable input mechanism) a summary cell 68. In the current embodiment, customized summary cell 71 has been selected 64 to provide a summary of column I 96, indicating "Gross" profits, for the year 2013. As shown in FIG. 9B, upon selecting 64 the customized summary cell 71, a drop down arrow 65 may appear. The drop down arrow 65 may be used to modify the summary provided for the set of organized data by selecting and/or switching between predefined summary functions. To illustrate, FIG. 9C depicts a user selecting 64 (e.g., via mouse) the drop down arrow 65 to request a view of summarization options.

Turning back to FIG. 8, the process of generating a custom summary function may include, in response to receiving the request to modify the summary cell 68, displaying (block 60) a summary function dialog box including input entry options. The input entry options may be various functions used to provide a particular summary for a set of organized data (e.g., summary for subset of cells pertaining to gross values in the year of 2013).

To illustrate, FIG. 10A depicts the input entry options 83 of a summary function dialog box 80 that appears upon a request to modify the customized summary cell 71. The summary function dialog box 80 may include summary option types including a category name, a blank cell, or one of various mathematical formulas (such as formulas to determine a sum or difference, over a range or subset of cells) and/or statistical formulas (such as formulas to determine an average, median, maximum, minimum, or mode, over a range of cells). As depicted in the current embodiment, the input entry options 83 may indicate the presently selected summary function (shown by a box around one of the input entry options 83), such as an automatic function 82. The automatic function 82 may be a default or preselected function of the application. For example, the preselected function may be selected and set by a manufacturer producing the spreadsheet application or preset by a user. In the some implementations, the automatic function 82 may default to a blank box.

Figure 10D:
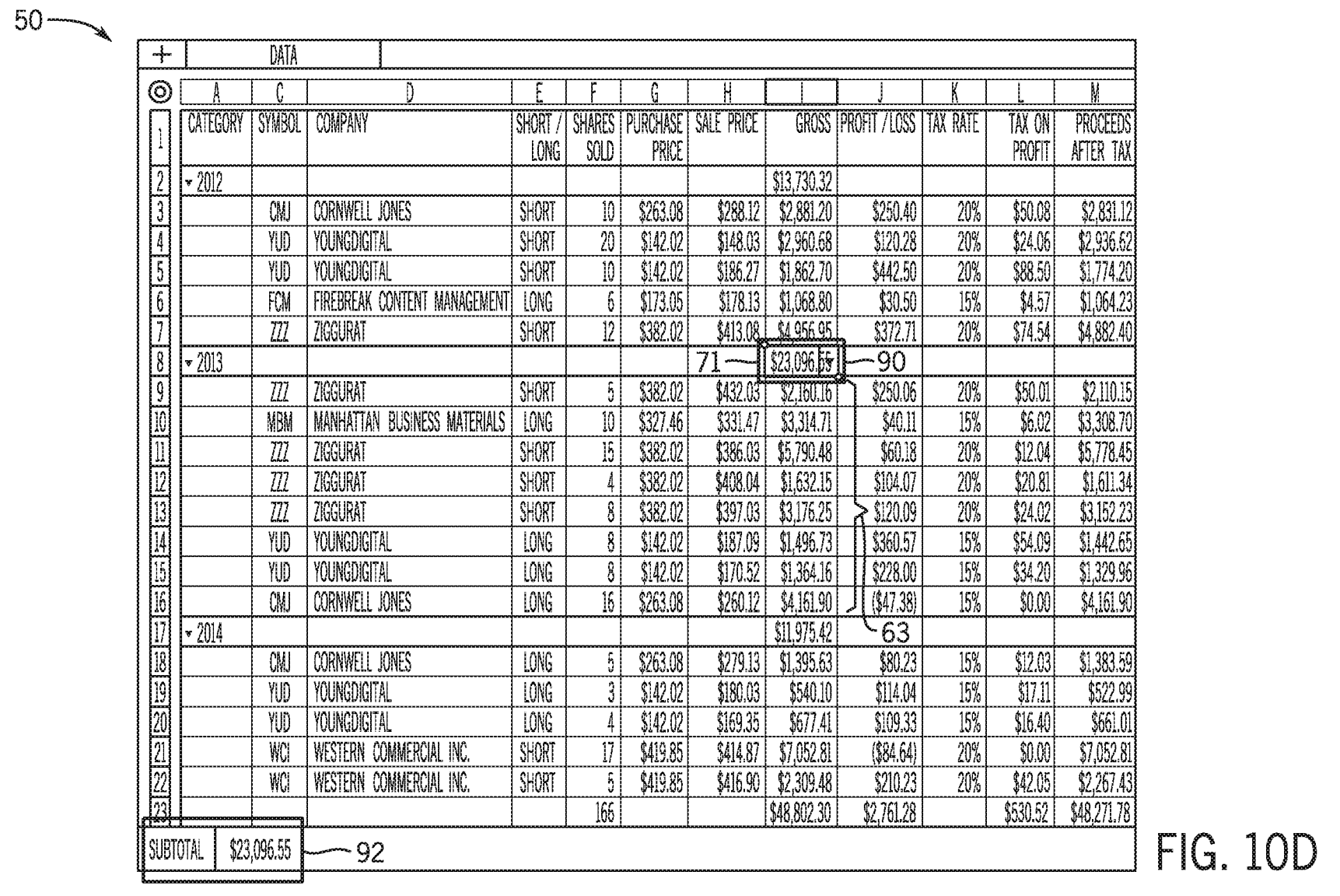

Turning back to FIG. 8, the process to generate a custom summary cell 68 may include, receiving (block 62), at the summary function dialog box 80, an indication of one or more input entries options 83 to a summary function made through the summary function dialog box 80. To illustrate, FIG. 10B depicts a request to modify a summary function in the input entry options 83. The summary provided by a summary cell 68 may be automatic, such as to automatically provide a blank box, which may be modified by a user selecting 64 a different function of the input entry options 83. In the current implementation, input entry options 83 include category name, blank, and mathematical functions including subtotal, average, min, max, and count. As shown, a user has selected 64 the subtotal function 86 to be used for summarizing the set of organized data of customized summary cell 71. Upon selection, the input entry options 83 may be updated to indicate that customized summary cell 71 presently provides a summary using the subtotal function 86 (shown by a box around the subtotal of the input entry options 83) rather than the previously selected automatic function 82, as shown in FIG. 10C. Accordingly, as shown in FIG. 10D, the customized summary cell 71 may provide a summary using the updated summary option. In particular, the customized summary cell 71 value that automatically provided a blank box as a summary is updated to provide a subtotal summary of "$23,096," reflecting the subtotal of subset 63 of cells I9-I16 pertaining to gross profit in 2013.

Moreover, upon selecting a summary cell 68 of table 50, a summary indicator 92 may appear at the bottom of the application. The summary indicator 92 may indicate the summary function applied to the selected summary cell 68 and/or the summary value. In the current implementation, the summary indicator 92 indicates that the function for selected customized summary cell 71 includes the subtotal function and has a value of $23,096.55. In this manner, a user may select 64 a summary cell 68 to view the function providing the associated summary.

However, the functions of the input entry options 83 for a summary cell 68 may be limited, such as to only predefined mathematical functions. The limited functions may not allow a user to thoroughly or effectively analyze data of table 50, and thus, an option to modify and customize the summary formula and its summary functions may be beneficial. To illustrate, FIG. 11A depicts a request to edit summary functions (e.g., by a user double selecting 94/double clicking using a mouse or touch pad) the customized summary cell 71. Double selecting 94 may result in entering an advanced editing mode, which may allow a user to modify and edit summary functions of a summary formula.

Figure 11B:
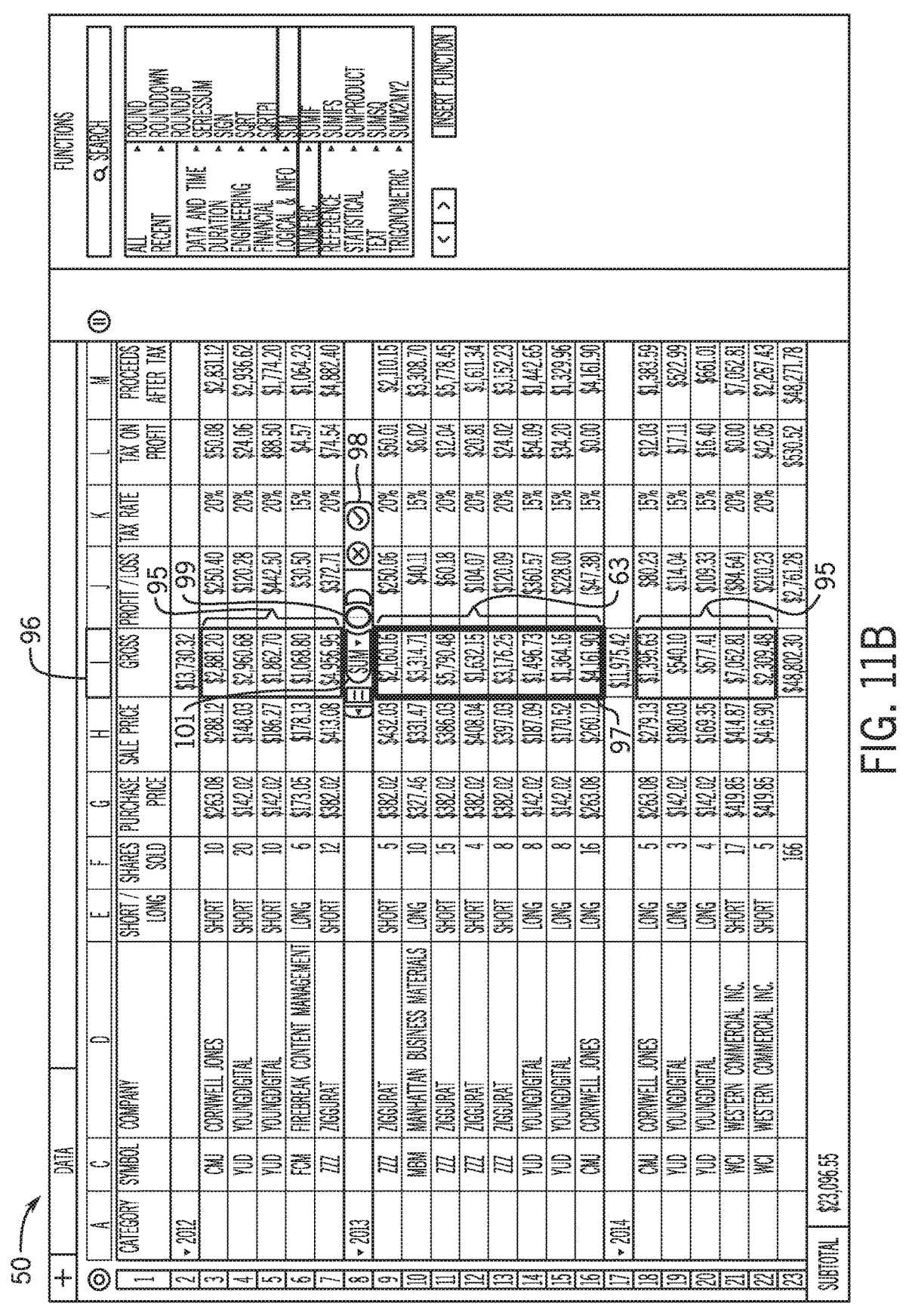

Upon selection of the request to modify the summary function, a view of the formula used for the summary function may appear, as depicted in FIG. 11B. As shown, a formula box 98 may appear upon the request to edit the subtotal function in advanced mode. The formula box 98 may indicate the formula used to calculate the output value for a summary function, such that the formula may include one or more function parameters 101 and/or one or more function sub-parameters 99 of the function parameter 101. In the current example, the formula box 98 indicates that a subtotal is calculated using a SUM (e.g., summation) function parameter 101 of column I 96 sub-parameter 99. Thus, the subtotal of $23,096.55 is calculated by a SUM of the values in column I 96 for the customized summary cell's 71 set of organized data (e.g., subset 63 of cells I9-I16).

Moreover, upon the request to edit the summary function of a summary cell 68, the range or subset of cells that are associated with summary cell being edited, such as customized summary cell 71, may be indicated to the user by a graphical shading, border, or box around the subset of cells. In the current implementation, customized subset box 97 indicates that the boxed subset 63 of cells correspond to the summary function of customized summary cell 71. In some implementations, and as discussed in detail in FIG. 17, summary cells 68 for additional relevant subsets of cells in the same category (e.g., column I 96) may be updated with corresponding edits to their respective summary functions. The additional relevant subset of cells used for the other summary cells 68 affected, may also be indicated to the user, such as by a lighter graphical shading for the additional relevant subset of cells with respect to relatively darker graphical shading of the subset of cells being edited (e.g., customized subset box 97), lighter weight of borders or boxes 95 around the additional relevant subset of cells, lighter color of the borders or boxes 95 around the additional relevant subset of cells, or lighter pattern of the borders or boxes 95 around the additional relevant subset of cells.

Figure 11C:
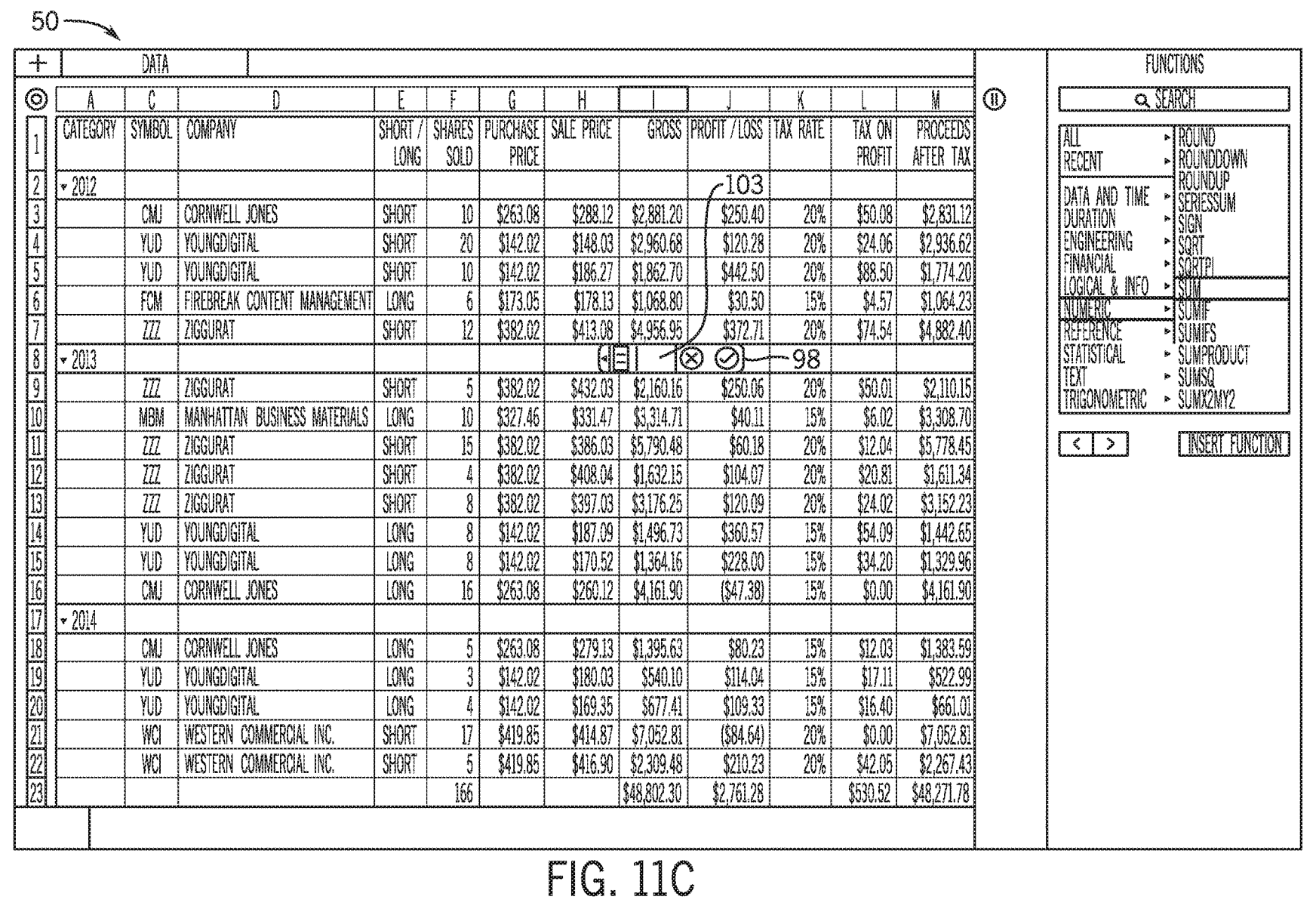
Figure 12A:
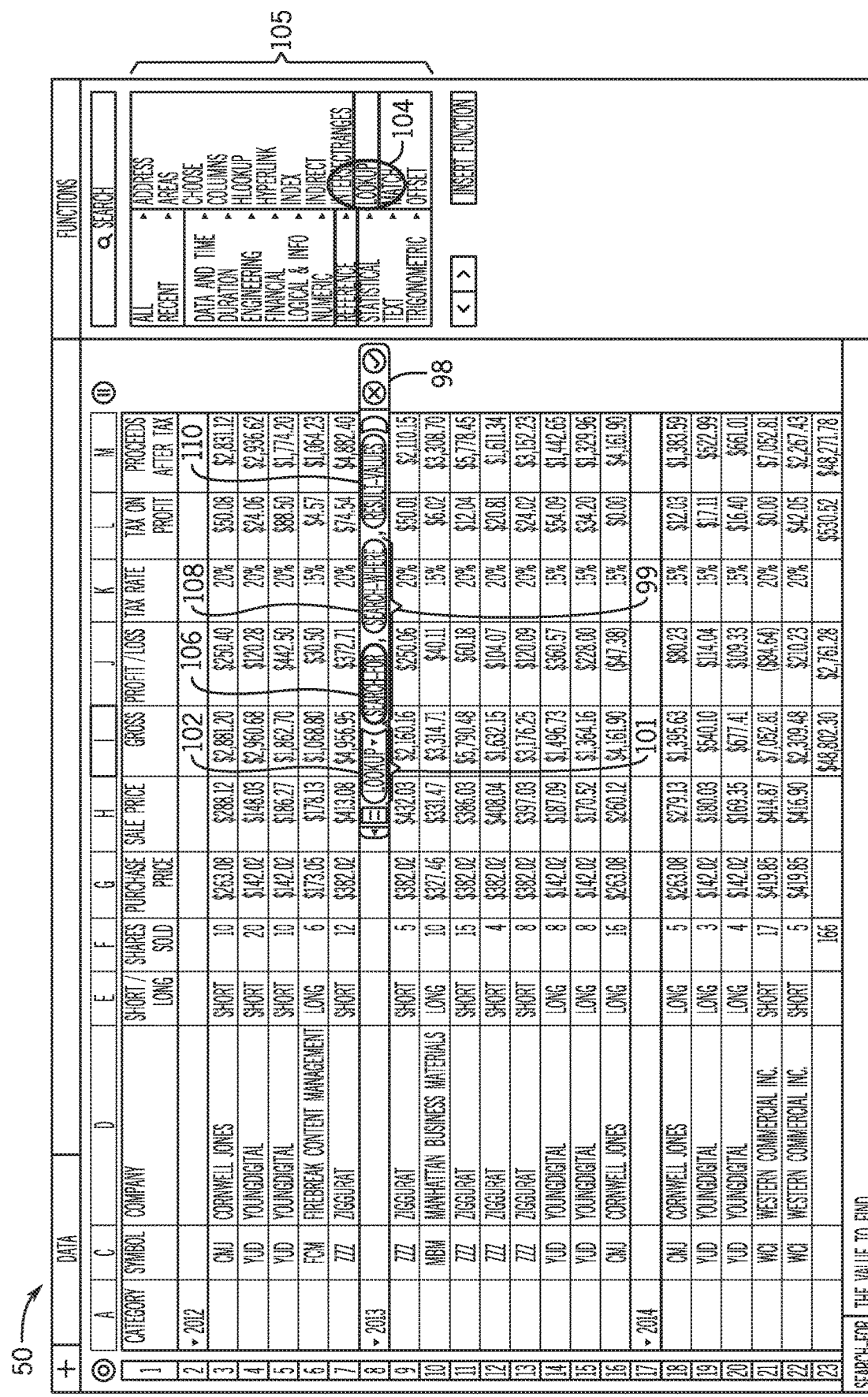
FIG. 12A is a block diagram of a customized function selected for the formula box, in accordance with an embodiment of the present disclosure.

However, as previously mentioned, a summary using the prepackaged functions may be limited, and thus, editing the summary function may be beneficial, such that one or more function parameters 101 and/or one or more sub-parameters 99 may be edited. As shown in FIG. 11C, the formula box 98 may be editable in advanced mode, such that an editable field 103 may appear upon the selection of the formula box 98. To detail the parameters of the formula box 98 that may be edited, FIG. 12A illustrates a formula box 98 with a selected customized function 102. The customized function 102 may be selected from a list of customized function options (e.g., options 105), which may include each function available in the spreadsheet application, such as engineering functions, financial functions, numerical functions, statistical functions, and so forth.

In some implementations, the customized function options 105 may include one or more functions not preexisting in the input entry options 83. However, in other implementations, the customized function 102 may include functions that are preexisting in the input entry options 83, but that are edited or combined in a manner that results in them being different than the preexisting input entry options 83 that are not otherwise editable.

In the current implementation, a user has selected the customized function 102 to include a LOOKUP function as the function parameter 101 of the formula in formula box 98. Depending on the customized function 102 selected, corresponding sub-parameters 99 used to calculate the output for the customized function 102 based on the function parameter 101, such as the LOOKUP function, may be automatically populated. By way of example, and as shown in the current embodiment, the LOOKUP function may use three parameters to calculate a LOOKUP output. Thus, upon the selection of the LOOKUP function as the function parameter 101 of the customized function 102, three corresponding sub-parameters 99 including a "search-for" first sub-parameter 106, a "search-where" second sub-parameter 108, and a "result-value" third sub-parameter 110, may appear in the formula box 98.

Briefly, the LOOKUP function may be used to find a match of a search value in a particular range of cells to find the searched value in a second range of cells. In doing so, the "search-for" first sub-parameter 106 may be used to set a value to be searched for within the first range of cells. The "search-where" second sub-parameter 108 may be used as the range (e.g., column of values for a set of grouped data) in which the "search-for" value is found. Moreover, the "result-values" third sub-parameter 110 may include the value to be returned based on the search using the "search-where" first sub-parameter 106 and "search-for" second sub-parameter 108. A user may select (e.g., by a mouse or touch pad) the parameters of the customized function 102 (e.g., first sub-parameter 106, second sub-parameter 108, and third sub-parameter 110) to change or set the value. In the current implementation, a user has selected 64 (not explicitly shown) the "search for" first sub-parameter 106.

Figure 12B:
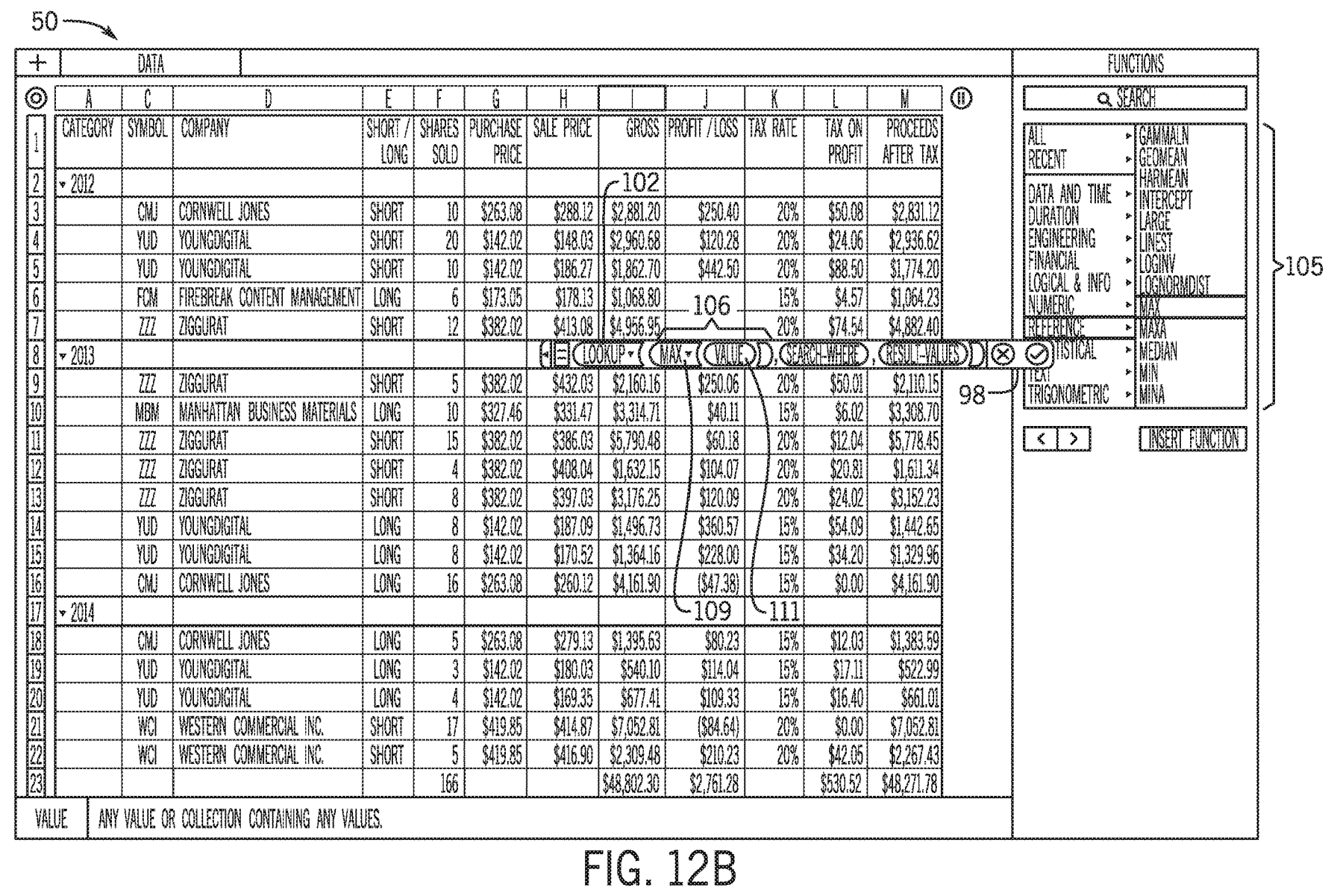

FIG. 12B illustrates setting a function of the first sub-parameter 106 of the customized function 102, such as the LOOKUP function. As shown, a user may set a first sub-parameter function 109 and first sub-parameter range 111 of the first sub-parameter 106 (e.g., parameters of the "search where" first sub-parameter 106). Here, the first sub-parameter function 109 is set to MAX, such as by selecting from the list of customized function options 105. Thus, the "search-where" first sub-parameter 106 may determine the MAX value for the first sub-parameter range 111.

Figure 12C:
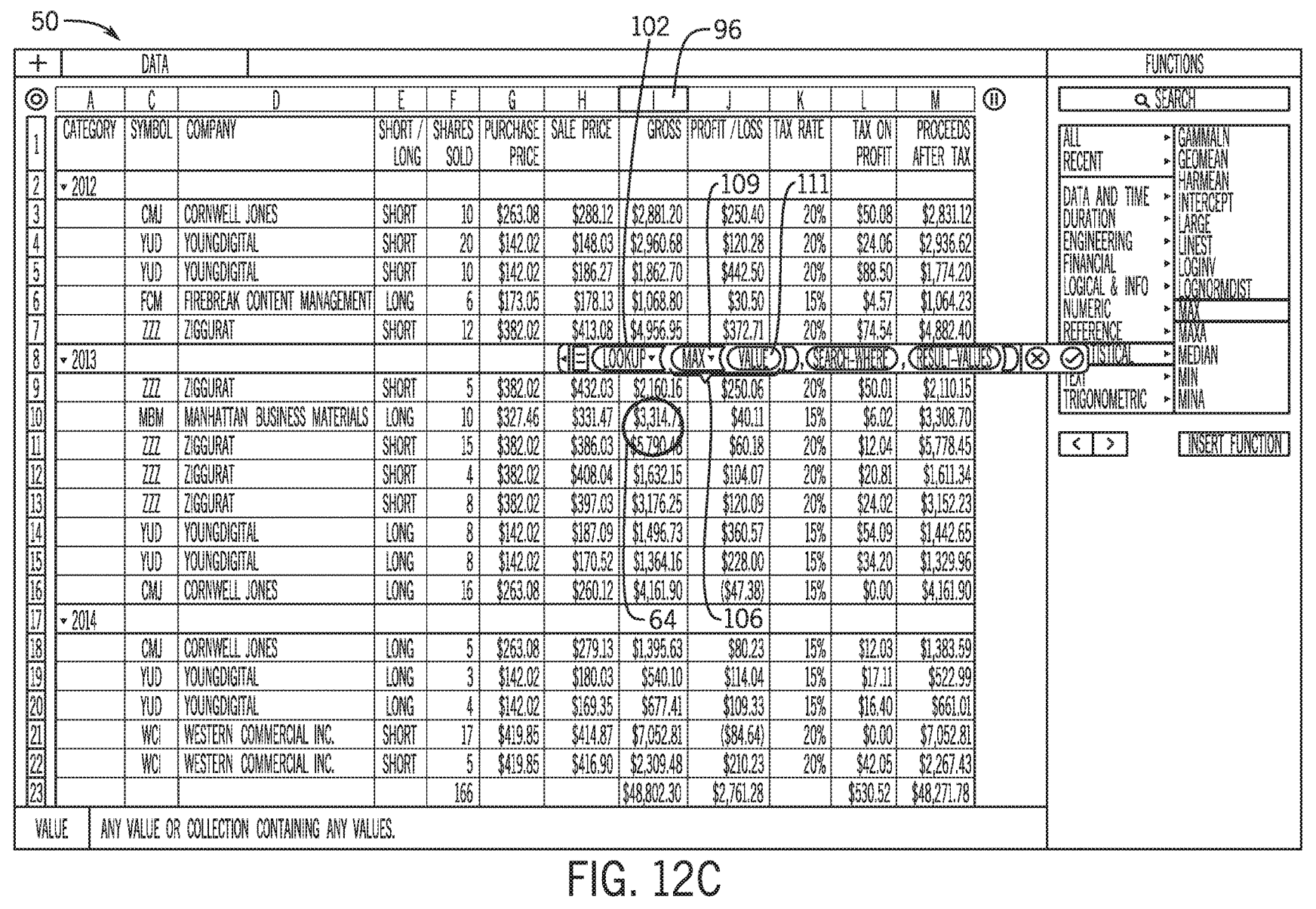
Figure 12D:
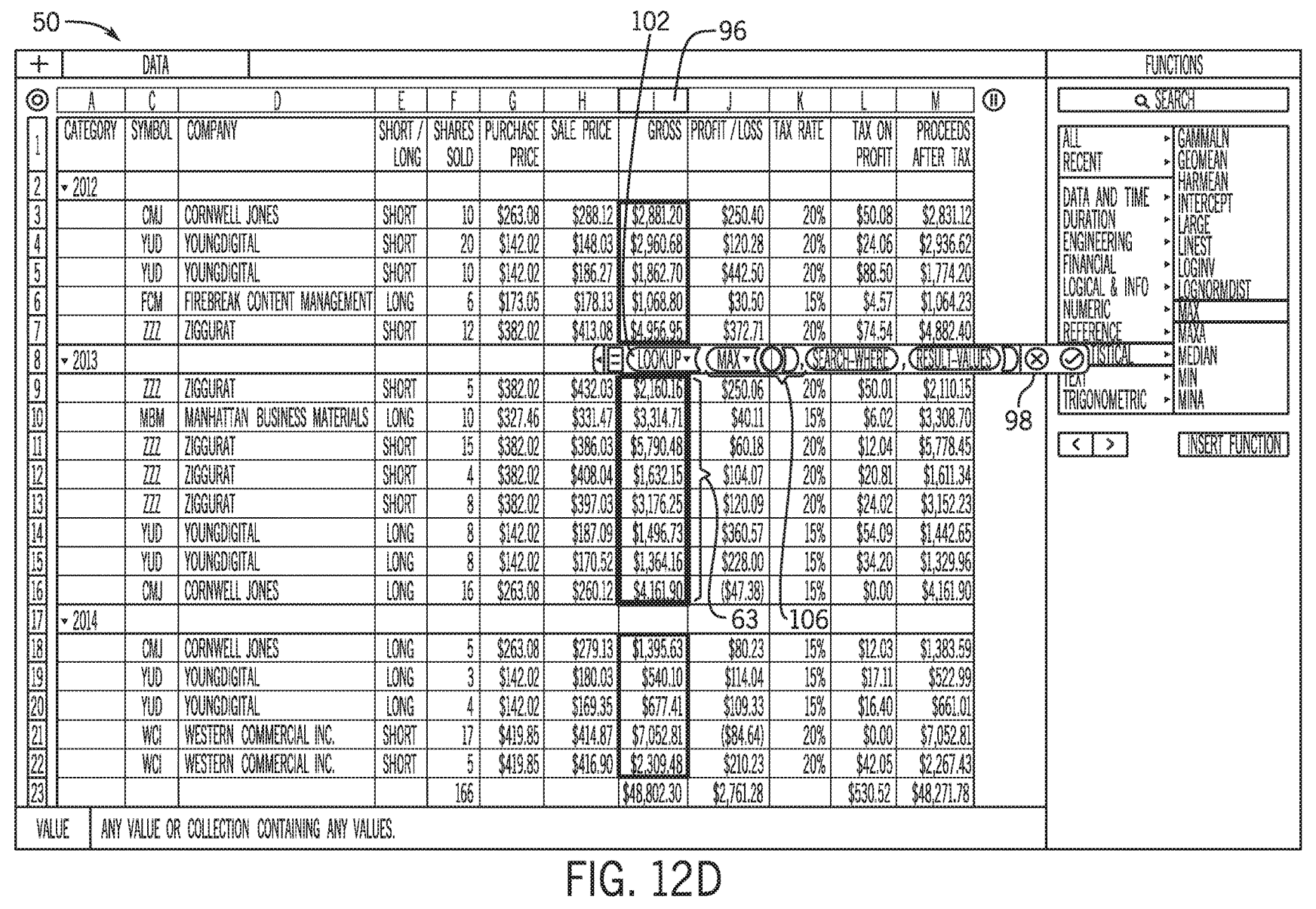

The first sub-parameter range 111 of the first sub-parameter 106 may be set using a column value, as shown in FIG. 12C. Here, a user selects 64 cell Ill in column I 96. As a result of selecting any cell within column I 96, the first sub-parameter range 111 may be set with the range of column I 96. Briefly, and as discussed in detail in FIG. 17, any cell selected within a column 54 (e.g., cell in column 54 including other sets of organized data) to set a parameter, such as the first sub-parameter range 111, may result in setting the parameter with the respective column 54. Accordingly, and as shown in FIG. 12D, the formula box 98 for the summary is updated based on the set "search-for" first sub-parameters 106 of the customized function 102. Thus, the "search-for" may result in searching for the maximum value of column I in subset 63, which is $5,790.48 of cell I11.

Figure 13A:
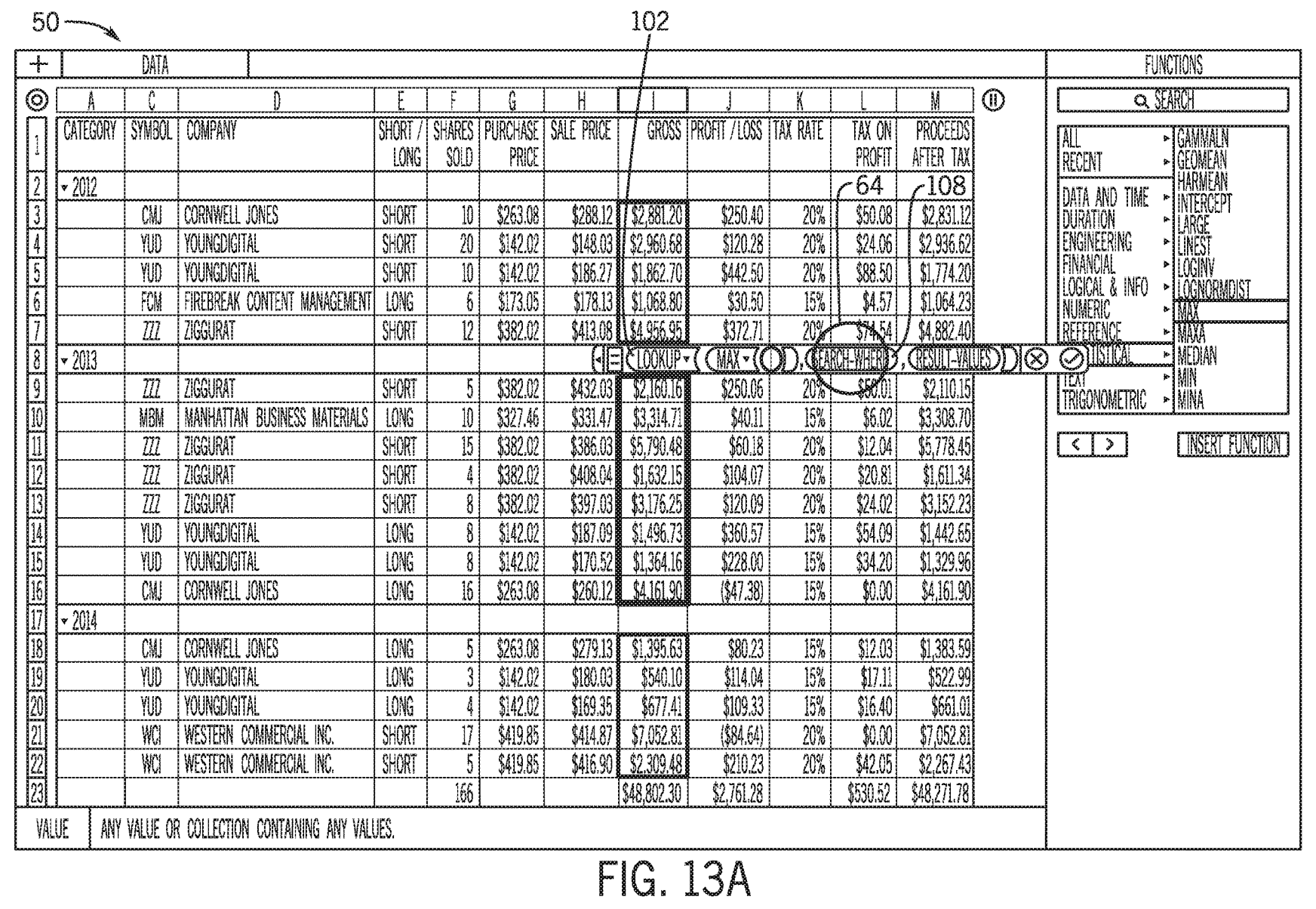
Figure 13B:
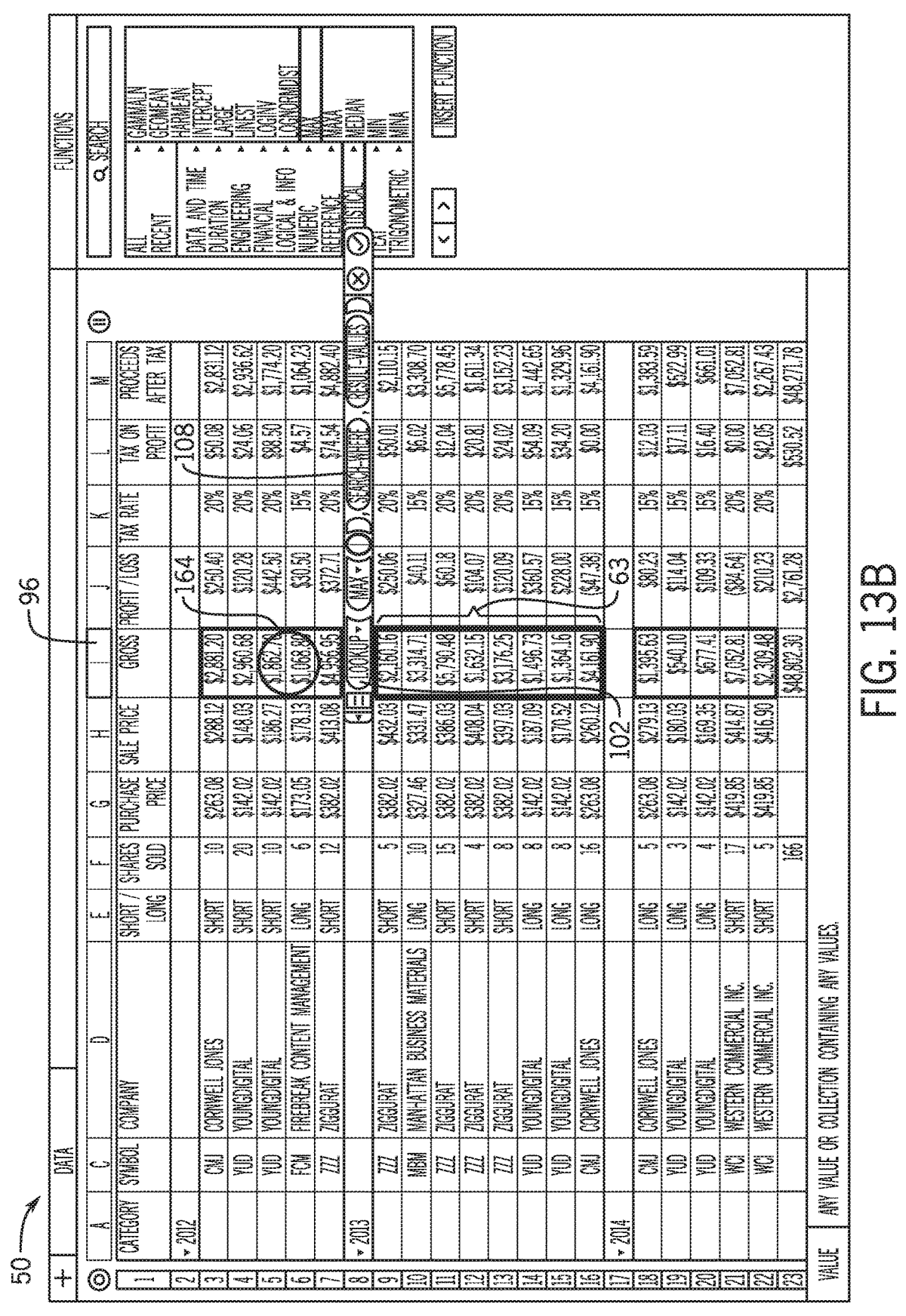
Figure 13C:
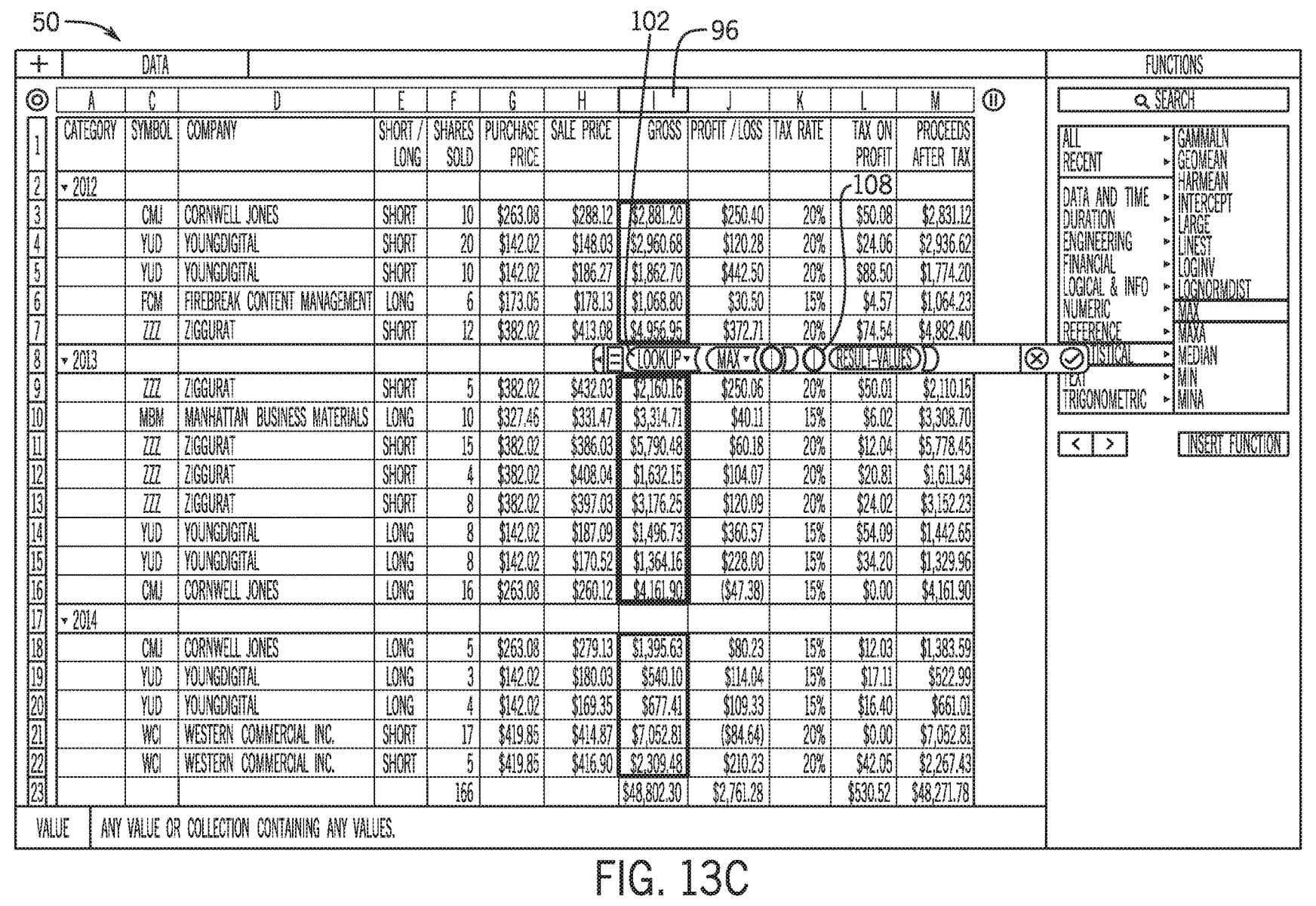

Next, the second sub-parameter 108 of the customized function 102 may be set by selecting a column value, as shown in FIG. 13A. As shown, a user may select 64 the "search-where" second sub-parameter 108. As a result, the "search-where" second sub-parameter 108 may be highlighted (not shown) to indicate that the parameter is being edited. As shown in FIG. 13B, a column 54 value may be used to set the second sub-parameter 108 of the customized function 102. Here, a user selects 64 cell I5, which is in a different subset of cells than the subset 63 of cells pertaining to customized summary cell 71. However, as previously described, the selection may result in setting the second sub-parameter 108 with a range of column I 96, as shown in FIG. 13C. Thus, the "search-where" may result in searching for a cell with the "search-for" value of $5,790.48 in column I of subset 63 of cells, which results in cell I11.

Similarly, the third sub-parameter 110 of the customized function 102 may be set, as shown in FIG. 14A. A user may select 64 the "result-values" third sub-parameter 110, such that the field may become editable. After selecting 64 the third sub-parameter 110, the user may select 64 the range of cells to set the third sub-parameter 110. As previously mentioned, the "result-value" parameter of the LOOKUP function includes searching for a value set by the first and second sub-parameters 106, 108 (e.g., the maximum number of column I 96 that is in column I 96, resulting in cell I11 in a range of cells). In the current embodiment, the user selects 64 cell F13 that has a value of 8 for the range of cells. As shown in FIG. 14B, upon the selection of cell F13, column F 140 may be set as the third sub-parameter 110.

Turning back to FIG. 8, the process 55 to customize a summary cell may include applying (block 64) the one or more input entries to a summary function for the summary cell, and evaluating the summary function to obtain a summary function result for the summary cell 68. More specifically, once a function and its parameters are set for a summary cell 68 while in advanced editing mode, as described in FIGS. 12A-14B, the summary may be calculated using the new parameters and provide an updated summary.

Figure 15:
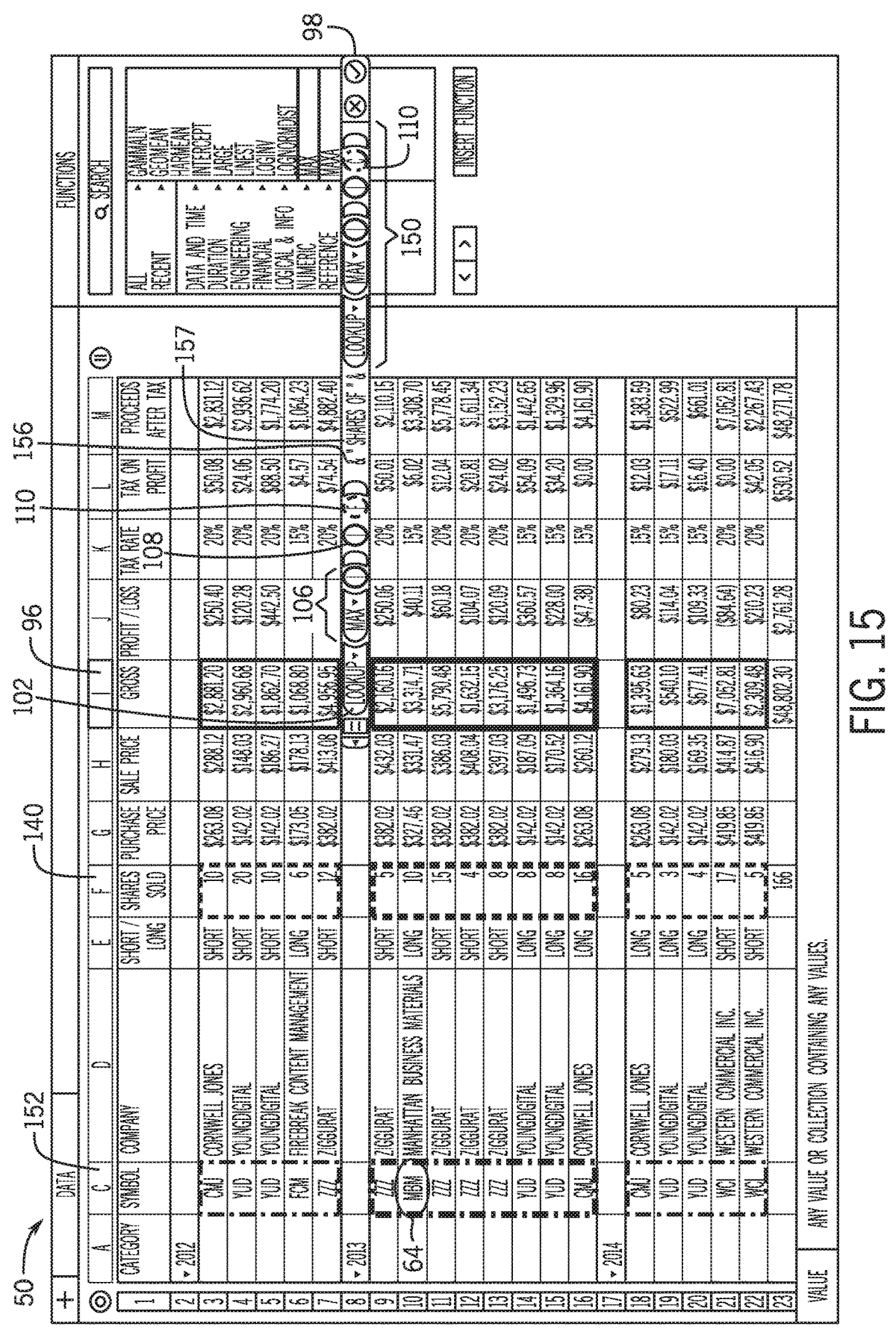

To illustrate, FIG. 15 depicts an updated formula box 98 based on edited and selected parameters for the customized function 102 for customized summary cell 71. As previously discussed, the customized function 102 includes a LOOKUP function with its particular parameters set to a "search-for" value of $5,790.48 and a "search-where" value of column I 96, resulting in cell I11, and a "result-value" of column F 140. Thus, the "result-value" may include a resulting cell in column F 140 corresponding to cell I11.

Accordingly, these parameters may be applied to the customized function 102 to provide the custom summary for the customized summary cell 71. As shown in the current embodiment, the customized function 102 may include more than one function (e.g., different than or more than one LOOKUP function), and may also include text.

As depicted, text or additional functions may be combined for the customized function 102 of a summary cell 68, such as customized summary cell 71. The additional text or function may be joined together by a "&" 156 operator, which is used to join two or more strings (e.g., output value from a function) in a formula. Here, the LOOKUP function is combined, such as by the & operator, to text 157. The text includes "shares of," which is further combined with a second customized function 150. In the current implementation, the second customized function 150 may include a second LOOKUP function, and the parameters may be set using the techniques described herein. Thus, the second customized function 150 includes a "search for" value of $5,790.48 and a "search where" value of column I, resulting in cell I11, and a "result-value" of column C 152. Here, a user has selected 64 cell C10 for the "result-value" third sub-parameter 110 of the second customized function 150, resulting in selecting all of column C 152 to find the corresponding cell in column C 152 for cell I11. Thus, the "result-value" may be the value in cell C11.

Accordingly, and turning back to FIG. 8, the process 55 of customizing a summary cell 68 may include presenting (block 66) the summary function result in the summary cell 68. In particular, a summary cell 68 may present the custom summary after evaluating the customized function 102 to determine a result for the summary cell 68. To illustrate, FIG. 16 depicts an updated summary for customized summary cell 71. Specifically, the summary of 15 shares of ZZZ for customized summary cell 71 is provided using the customized formula of customized functions 102 and texts, as previously described in FIG. 15. Thus, editing the summary formula of formula box 98, such as by entering the advanced editing mode, may allow using custom or unique formulas and functions to provide a summary for a set of organized data.

Additionally, summary indicator 92 that indicates the summary function applied and/or value of a selected summary cell 68, may be updated to reflect the customization of a summary cell 68. By way of example, upon the selection of the customized summary cell 71, the summary indicator 92 may be updated from its previous state indicating a "subtotal" summary function to a "custom" function. In this manner, the summary indicator 92 may indicate in the GUI that a presented summary (e.g., 15 shares of ZZZ) for the selected customized summary cell 71 is a customized function 102. However, in some embodiments, the "custom" indication may not be present until the customization of a summary cell 68 is completed, such as by selecting an OK button or check button on the formula box 98 after setting each function parameters. When the summary cell 68 is being edited, the summary indicator 92 may include a "value" for the summary function indication and "any value or collection containing any values" for the value indication. This indication may signal to a user that the selected summary cell 68 is being edited or modified.

Moreover, process 55 of FIG. 8 to customize a summary cell may include, in some embodiments, updating (block 69) one or more relevant ranges to the edited summary function for additional sets of organized cells and evaluate the updated summary functions to obtain summary function results for each of the additional sets of organized cells. Thus, upon the customization of a summary cell 68 (e.g., customized summary cell 71) within a category (e.g., column 54) of table 50, other summary cells 68 for sets of organized data within the same category, such as for years 2012 and 2014, may also be updated with the same customized functions 102 and/or texts in its summary formula. After updating the relevant ranges with the custom summary function, the process 55 may present (block 70) the summary function results in summary cells 68 associated with the additional sets of organized cells.

By way of example, and as depicted in FIG. 16, the formula and summary functions of updated summary cell 161 for year 2012 and updated summary cell 162 for year 2014 may be automatically updated to provide a summary corresponding to the customized functions 102 and texts of customized summary cell 71. Thus, the automatic update of the summary function of updated summary cell 161 may provide a summary of "12 shares of ZZZ." Specifically, the first LOOKUP function providing the "12" in the summary value may be determined by the corresponding customized function 102 that includes a "search-for" value of $4,956.95 (e.g., MAX value in column I 96) and a "search-where" value of column I 96, resulting in cell 17, and a "result-value" of column F 140, resulting in value of 12. The "shares-of" in the summary may be the text edited by the user for customized summary cell 71 and combined using the "&" operator as discussed above. Moreover, the "ZZZ" value indicating company name Ziggurat may be determined by the corresponding second LOOKUP function with a "search-for" value of $4,956.95 (e.g., MAX value in column I 96) and a "search-where" value of column I 96, resulting in cell 17, and a "result-value" of column C 152, resulting in value of "ZZZ." Similarly, the summary of updated summary cell 162 as a result of the customization of customized summary cell 71 may result in providing a summary of "17 shares of ZZZ."

Figure 17:
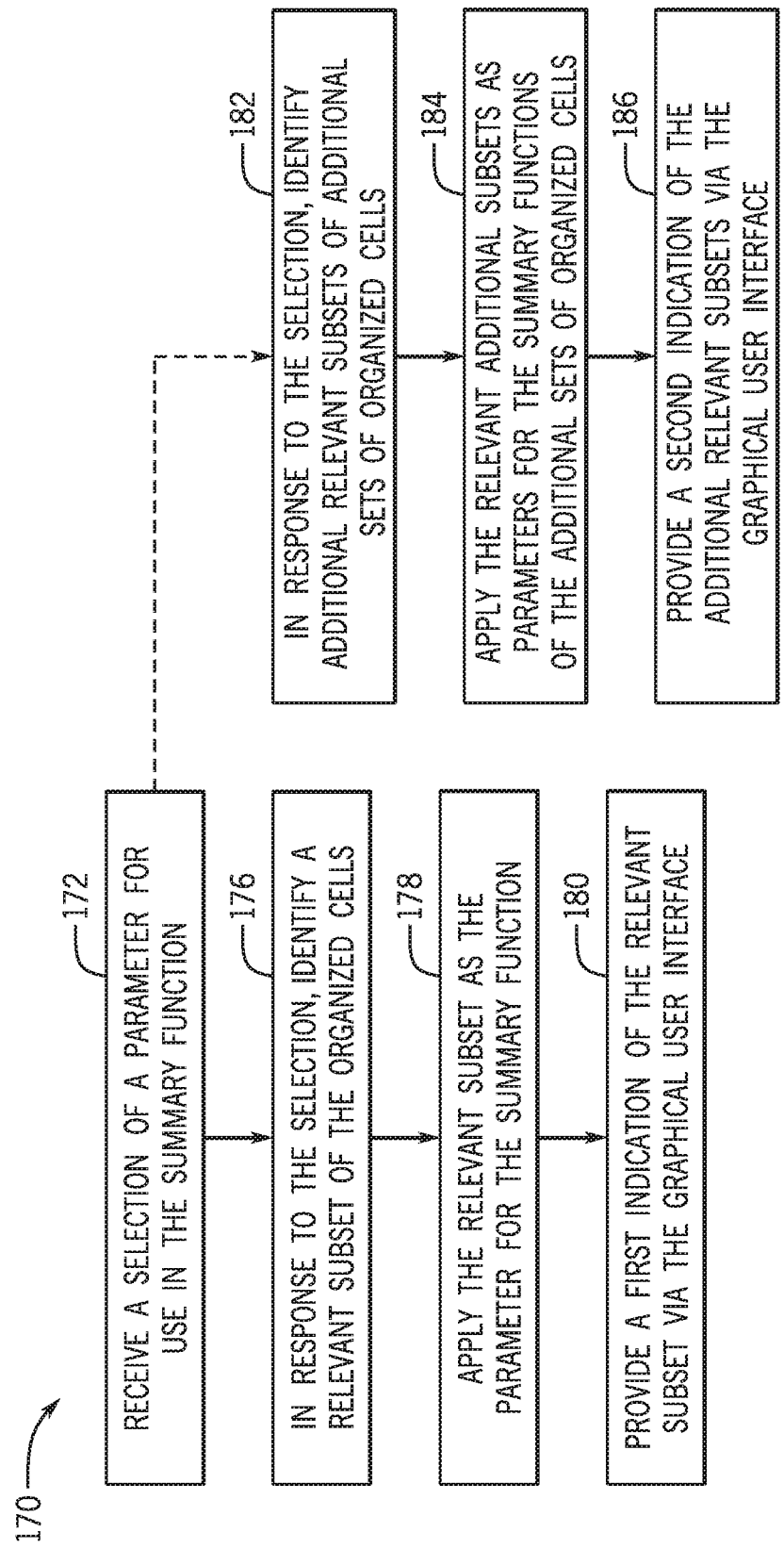
FIG. 17 is a process flow diagram, illustrating a process for indicating a relevant set of data for a parameter of a customized function and automatically updating a summary cell for one or more sets of organized cells, in accordance with an embodiment of the present disclosure.
Figure 18:
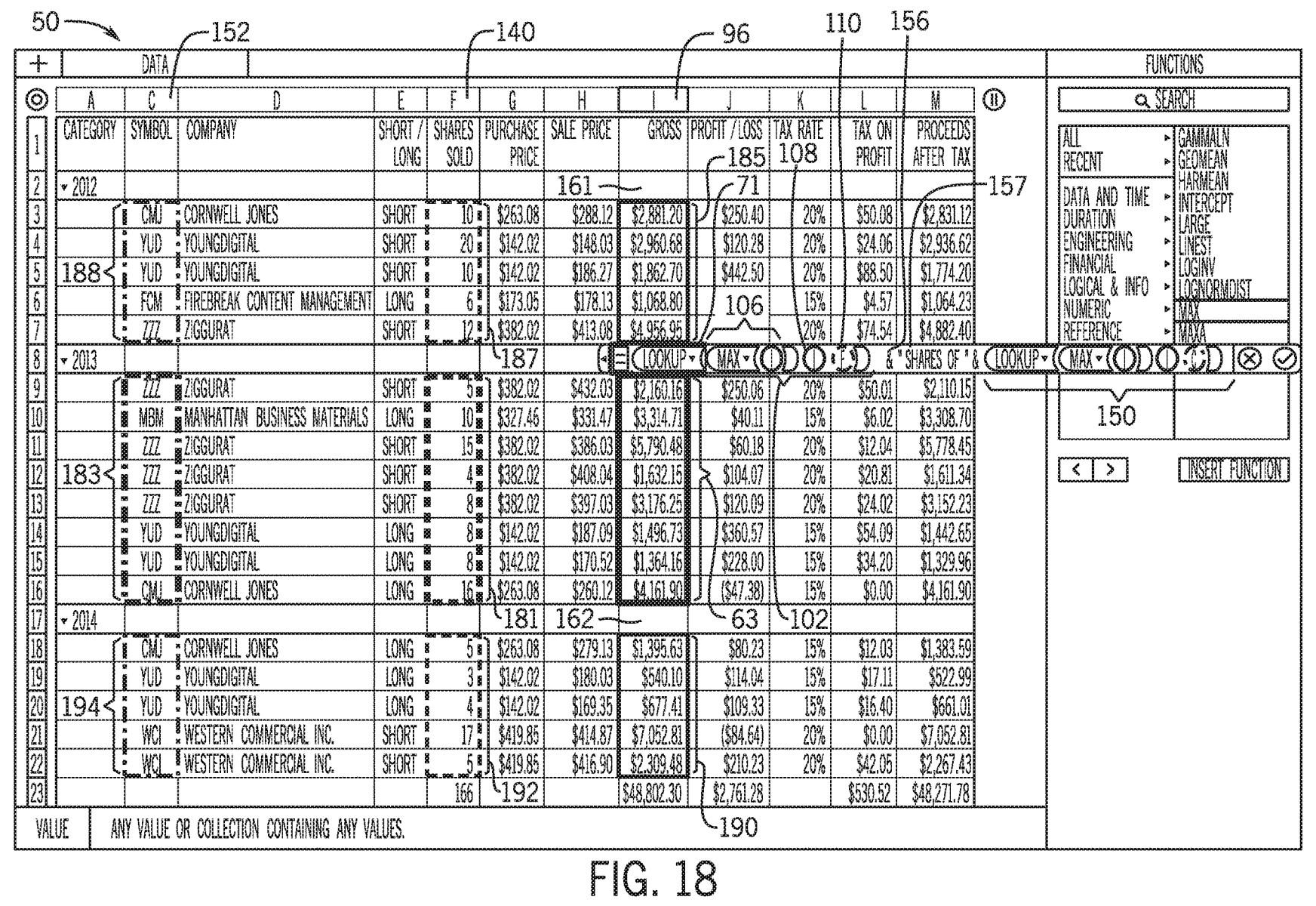

Turning now to a more detailed discussion of indicating a relevant set of data for a parameter of a customized function 102 and automatically updating corresponding parameters for updated summary cells 161, 162, FIG. 17 illustrates a process 170 flow diagram for the indication of relevant sets of data and automatically modifying the summary formulas and functions for updated summary cells 161, 162. In one embodiment, when a user is in advanced editing mode and editing the parameters of a customized function 102, the process 170 may include receiving (block 172) a selection of a parameter for use in the summary function. For example, and as shown in FIG. 18, a selection of parameters (e.g., customized function 102 and second customized function 150 parameters using column I 96, column F 140, and column C 152) may be set for customized summary cell 71. In response to the selected parameters, the process 170 may include identifying (block 176) a relevant subset of the organized cells and then continue with applying (block 178) the relevant subset as the parameter for the summary function. Thus, the parameter values to be considered (e.g., column I 96) may be narrowed to the subset of organized cells, such as cells for year 2013.

Turning back to FIG. 17, after applying the relevant subset as the parameter of the summary function, the process 170 may provide (block 180) a first indication of the relevant subset via the graphical user interface. The indication may include, but is not limited to, shading the relevant subset, highlighting the relevant subset, bolding the font within the relevant subset, bordering the relevant subset, and/or boxing the relevant subset. As illustrated in FIG. 18, although the entire columns I 96, F 140, and C 152 are selected as parameters for customized summary cell 71, which is in category 2013, the summary output may take into consideration the parameters within the relevant subset of cells for year 2013. Thus, the customized function 102 and second customized function 150 of the customized summary cell 71 for year 2013 may consider subset 63 for parameters using column I 96, subset 181 for parameters using column F 140, and subset 183 for parameters using column C 152. Here, to provide a GUI indication of the relevant subset considered for the parameters, a thick border appears around the cells.

Moreover, in some embodiments, in response to a selection of a parameter for use in the summary function, process 170 of FIG. 17 may identify (block 182) additional relevant subsets of additional sets of organized cells. Thus, after receiving selection of parameters for use in the summary function for customized summary cell 71, such as by selecting a particular column 54 for a parameter of customized function 102, the process 170 may identify the same parameters to be used for a summary function for the additional sets of data in the same column 54. Thus, corresponding subset parameters may be identified for the additional sets of grouped data for a category. Here, the category is "gross" profits and grouping is based on years, so the summary cells 68 providing a summary of "gross" profits for 2012 and 2014 may be identified.

Once the relevant additional subsets are identified, the process 170 of FIG. 17 applies (block 184) the relevant additional subsets as parameters for the summary functions of the additional sets of organized cells. Thus, the identified parameters may be used for the corresponding customization (e.g., customized functions 102 and/or texts), such as to provide updated summaries for updated summary cells 161 and 162 of FIG. 16.

Moreover, in some embodiments, process 170 of FIG. 17 may provide (block 186) a second indication of the additional relevant subsets via the graphical user interface. For example, identification may be indicated to the user, such as by shading, highlighting, or applying a border around the additional subset of cells. By way of example, FIG. 18 illustrates the identified parameter selections for years 2012 and 2014 with dashed boxes. In particular, the corresponding customized function 102 and second customized function 150 of updated summary cell 161 for year 2012 may use identified subset 185 for parameters using column I 96, subset 187 for parameters using column F 140, and subset 188 for parameters using column C 152. Similarly, the corresponding customized function 102 and second customized function 150 of updated summary cell 162 for year 2014 may use identified subset 190 for parameters using column I 96, subset 192 for parameters using column F 140, and subset 194 for parameters using column C 152.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function]. . . " or "step for [perform] ing [a function]. . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, machine-readable medium, comprising machine-readable instructions that, when executed by one or more processors, cause the one or more processors to:
   receive a request to modify a summary cell for a set of organized cells that are automatically grouped by a grouping function of a spreadsheet application based upon a user indicated commonality, wherein the summary cell is automatically generated in a header row of the set of organized cells and presents a summary for the set of organized cells, and wherein the summary cell is automatically associated with the set of organized cells independent from a user indication of an association with the set of organized cells;
   in response to the request, display a formula editing mode dialog box that enables editing of a summary cell formula by a user;
   receive, at the formula editing mode dialog box, an indication of one or more input entries to edit the summary cell formula, wherein a range of the summary cell formula is limited to the set of organized cells, by the spreadsheet application, independent from a user indication of the range;
   apply the one or more input entries to the summary cell formula and evaluate the summary cell formula with the one or more input entries applied to obtain a result for the summary cell formula; and
   present the result of the summary cell formula in the summary cell.

2. The machine-readable medium of claim 1, comprising machine-readable instructions that, when executed by the one or more processors, cause the one or more processors to:
   update formulas of summary cells for one or more relevant ranges to the modified summary cell for additional sets of organized cells and evaluate the updated formulas to obtain results for the summary cells of each of the additional sets of organized cells; and
   present the results in the summary cells associated with the additional sets of organized cells.

3. The machine-readable medium of claim 1, wherein:
receiving the indication of the one or more input entries to edit the summary cell, comprises receiving a selection of a parameter for use in the summary cell formula; and applying the modifications to the one or more input entries to the summary cell comprises:
in response to the selection, identify a relevant subset of the set of organized cells also associated with the user indicated commonality; and
apply the relevant subset as the parameter for the summary cell formula.

4. The machine-readable medium of claim 3, comprising machine-readable instructions that, when executed by the one or more processors, cause the one or more processors to provide a first indication of the relevant subset via a graphical user interface.

5. The machine-readable medium of claim 3, comprising machine-readable instructions that, when executed by the one or more processors, cause the one or more processors to:
in response to the selection, identify additional relevant subsets of additional sets of organized cells; and
apply the additional relevant subsets as parameters for summary cell formulas for summary cells of the additional sets of organized cells.

6. The machine-readable medium of claim 5, comprising machine-readable instructions that, when executed by the one or more processors, cause the one or more processors to provide a first indication of the relevant subset via a graphical user interface and provide a second indication of the additional relevant subsets via the graphical user interface.

7. The machine-readable medium of claim 6, wherein the first indication of the relevant subset comprises a first graphical shading over the relevant subset and the second indication of the additional relevant subsets comprises a second graphical shading over the additional relevant subsets.

8. The machine-readable medium of claim 7, wherein the first graphical shading is relatively darker than the second graphical shading.

9. The machine-readable medium of claim 6, wherein the first indication of the relevant subset comprises a first graphical border around the relevant subset and the second indication of the additional relevant subsets comprises a second graphical border around the additional relevant subsets.

10. The machine-readable medium of claim 9, wherein the first graphical border is relatively darker than the second graphical border.

11. A system, comprising:
an electronic display, configured to display a graphical user interface (GUI) comprising an organized spreadsheet, wherein cells of the organized spreadsheet are organized into sets of organized cells that are automatically grouped by a grouping function of a spreadsheet application based on a user indicated commonality; and
one or more processors, configured to:
receive, via a selection in the graphical user interface, a request to modify a summary cell for a set of organized cells, wherein the summary cell is automatically generated in a header row of the set of organized cells and presents a summary for the set of organized cells, and wherein the summary cell is automatically associated with the set of organized cells independent from a user indication of an association with the set of organized cells;

in response to the request, display in the graphical user interface a formula editing mode dialog box that enables editing of a summary cell formula by a user;
receive, via selection in the formula editing mode dialog box, an indication of one or more input entries to edit the summary cell formula, wherein a range of the summary cell formula is limited to the set of organized cells, by the spreadsheet application, independent from a user indication of the range;
apply the one or more input entries to the summary cell formula and evaluate the summary cell formula with the one or more input entries applied to obtain a result for the summary cell formula; and
present, in the graphical user interface, the result of the summary cell formula in the summary cell.

12. The system of claim 11, wherein the organized spreadsheet comprises a summary indicator that, in response to selection of the summary cell, indicates a summary function associated with the summary cell formula, value of the summary cell, or a combination thereof.

13. The system of claim 12, wherein the summary function displays "custom" for the summary cell upon completion of the modification of the summary cell.

14. The system of claim 11, wherein the indication of one or more input entries comprises selecting a new summary function that is different than predefined function options provided by the formula editing mode dialog box.

15. The system of claim 14, wherein the indication of one or more input entries further comprises text input entries.

16. The system of claim 15, wherein the result in the summary cell comprises an output of the new summary function, the text input entries, or a combination thereof.

17. The system of claim 11, wherein the formula editing mode dialog box enables modification of a summary function associated with the summary cell formula, parameters of the summary cell formula, text, or any combination thereof.

18. A method for modifying a summary cell of a spreadsheet application comprising:
receiving a request to modify the summary cell for a set of organized cells that are automatically grouped by a grouping function of a spreadsheet application based upon a user indicated commonality, wherein the summary cell is automatically generated in a header row of the set of organized cells and presents a summary for the set of organized cells, and wherein the summary cell is automatically associated with the set of organized cells independent from a user indication of an association with the set of organized cells;
in response to the request, displaying a formula editing mode dialog box that enables editing of a summary cell formula by a user;
receiving, at the formula editing mode dialog box, an indication of one or more input entries to edit the summary cell formula, wherein a range of the summary cell formula is limited to the set of organized cells, by the spreadsheet application, independent from a user indication of the range;
applying the one or more input entries to the summary cell formula and evaluating the summary cell formula with the one or more input entries applied to obtain a result for the summary cell formula; and
presenting the result of the summary cell formula in the summary cell.

19. The method of claim 18, comprising:
updating formulas of summary cells for one or more relevant ranges to the modified summary cell for additional sets of organized cells and evaluating the updated formulas to obtain results for the summary cells of each of the additional sets of organized cells; and presenting the results in the summary cells associated with the additional sets of organized cells.

20. The method of claim 18 comprising:

receiving the indication of the one or more input entries to edit the summary cell, comprises receiving a selection of a parameter for use in the summary cell formula; and applying the one or more input entries to the summary cell comprises:
- in response to the selection, identifying a relevant subset of the set of organized cells also associated with the user indicated commonality; and
- applying the relevant subset as the parameter for the summary cell formula.

\* \* \* \* \*